US012107331B2

(12) United States Patent
Jornet et al.

(10) Patent No.: US 12,107,331 B2
(45) Date of Patent: Oct. 1, 2024

(54) SMART METAL-GRAPHENE HYBRID REFLECTARRAY AT THZ FREQUENCIES

(71) Applicants: Northeastern University, Boston, MA (US); Government of the United States as represented by the Secretary of the Air Force, Rome, NY (US); The Research Foundation for The State University of New York, Amherst, NY (US)

(72) Inventors: Josep Miguel Jornet, Needham, MA (US); Arjun Singh, Southbridge, MA (US); Michael Andrello, Rome, NY (US); Erik Einarsson, Buffalo, NY (US); Ngwe Thawdar, Rome, NY (US)

(73) Assignees: Government of the United States as Represented by the Secretary of the Air Force, Rome, NY (US); Northeastern University, Boston, MA (US); Research Foundation for the State University of New York York, Amherst, NY (US)

( * ) Notice: Subject to any disclaimer, the term of this patent is extended or adjusted under 35 U.S.C. 154(b) by 21 days.

(21) Appl. No.: 17/804,446

(22) Filed: May 27, 2022

(65) Prior Publication Data

US 2022/0393363 A1 Dec. 8, 2022

Related U.S. Application Data

(60) Provisional application No. 63/195,031, filed on May 30, 2021, provisional application No. 63/242,550, filed on Sep. 10, 2021.

(51) Int. Cl.
*H01Q 15/14* (2006.01)
*H01Q 1/38* (2006.01)
*H01Q 21/06* (2006.01)

(52) U.S. Cl.
CPC ............ *H01Q 15/148* (2013.01); *H01Q 1/38* (2013.01); *H01Q 21/065* (2013.01)

(58) Field of Classification Search
CPC ...... H01Q 15/148; H01Q 1/38; H01Q 21/065; H01L 29/1606; H01L 2223/6677; H01L 23/66
See application file for complete search history.

(56) References Cited

U.S. PATENT DOCUMENTS

2010/0283687 A1* 11/2010 Ehelen ................ H01Q 21/065 343/700 MS
2018/0315880 A1* 11/2018 Jadidi .................... H01L 31/09

OTHER PUBLICATIONS

Akyildiz, I. et al., "Combating the Distance Problem in the Millimeter Wave and Terahertz Frequency Bands", IEEE Communications Magazine , vol. 6, No. 6, 2018, pp. 102-108.

(Continued)

*Primary Examiner* — David E Lotter
(74) *Attorney, Agent, or Firm* — Hamilton, Brook, Smith & Reynolds, P.C.

(57) ABSTRACT

A hybrid radiating element may comprise a dielectric substrate having a thickness, a top surface and a bottom surface, and an electrically conductive patch disposed on the top surface of the dielectric substrate. The hybrid radiating element may further comprise a graphene stub disposed on the top surface of the dielectric substrate. The graphene stub may be contiguous with, and electrically coupled to, the electrically conductive patch. The hybrid radiating element may further comprise an electrically conductive layer disposed on the bottom surface of the dielectric substrate. An array of hybrid radiating elements may be arranged in a grid pattern of M rows and N columns. A codebook set of biasing voltages may be arranged to drive the radiating elements in the array as a phase transformation matrix, thereby manipulating the reflection of an incoming electromagnetic wave.

22 Claims, 12 Drawing Sheets
(12 of 12 Drawing Sheet(s) Filed in Color)

(56) References Cited

OTHER PUBLICATIONS

Akyildiz, I. et al., "Realizing Ultra-Massive MIMO (1024x1024) Communication in the (0.06-10) Terahertz Band", Nano Communication Networks, vol. 8, 2016, pp. 46-54.
Balanis, Antenna Theory Analysis And Design, 3rd Edition, A John Wiley & Sons, Inc., Publication, (2005).
Carrasco, E. et al., "Tunable Graphene Reflective Cells for THz Reflectarrays and Generalized Law of Reflection", Applied Physics Letters, vol. 2, No. 10, 2013, 8 Pages.
Dahri, M. et al., "Polarization Diversity and Adaptive Beamsteering for 5G Reflectarrays: A Review", IEEE Access , vol. 6, 14 pages.
Falkovsky, L. et al., "Space-time dispersion of graphene conductivity", The European Physical Journal B, vol. 56, 2007, pp. 281-284.
Geim, A.K. et al., "The rise of graphene", Nanoscience and Technology, vol. 6, 2017, pp. 11-19.
Hanson, G. et al., "Dyadic Green's Functions and Guided Surface Waves for a Surface Conductivity", Journal of Applied Physics, vol. 103, No. 6, 2008, 18 pages.
Headland, D. et al., "Tutorial: Terahertz beamforming, from concepts to realizations", APL Photonics, vol. 3, No., 5, 2017, 33 pages.
Hum, S. et al., "Reconfigurable Reflectarrays and Array Lenses for Dynamic Antenna Beam Control: A Review", IEEE Transactions on Antennas and Propagation, vol. 62, No. 1, 2014, pp. 183-198.
Jornet. J. et al., "Graphene-Based Nano-Antennas for Electromagnetic Nanocommunications in the Terahertz Band", Proceedings of the Fourth European Conference on Antennas and Propagation, 2010, 5 pages.
Li, X. et al., "Dual-beam scanning using graphene-based reflectarray", 2015 Asia-Pacific Microwave Conference (APMC), 2015, 3 pages.
Luk, K. et al., "A microfabricated low-profile wideband antenna array for terahertz communications", Scientific Reports, vol. 7, No. 1268, 2017, 11 pages.
Mayorov, A. et al., "Micrometer-Scale Ballistic Transport in Encapsulated Graphene at Room Temperature", Nano Lett., vol. 11, No. 6, 2011, pp. 2396-2399.
Nayeri, P. et al., Reflectarray Antennas: Theory, Designs, and Applications, IEEE Press, 2018, 30 pages.
Nie, S. et al., "Intelligent Environments Based on Ultra-massive Mimo Platforms for Wireless Communication in Millimeter Wave and Terahertz Bands", ICASSP 2019—2019 IEEE International Conference on Acoustics, Speech and Signal Processing (ICASSP), 2019, 5 pages.
Niu, T. et al., "Experimental demonstration of reflectarray antennas at terahertz frequencies", Optics Express, vol. 21, No. 3, 2013, pp. 2875-2889.
Piesiewicz, R. et al., "Short-Range Ultra-Broadband Terahertz Communications: Concepts and Perspectives", IEEE Antennas and Propagation Magazine, vol. 49, No. 6, 2007, pp. 24-39.
Rappaport, T. et al., "Wireless Communications and Applications Above 100 GHz: Opportunities and Challenges for 6G and Beyond", IEEE Acess, vol. 7, 2019, pp. 78729-78757.
Ryzhii, V. et al., "Terahertz Plasma Waves in Gated Graphene Heterostructures ", Japanese Journal of Applied Physics, vol. 45, No. 9L, 2006, 4 pages.
Sarieddeen, H. et al., "Terahertz-Band Ultra-Massive Spatial Modulation Mimo", IEEE Journal on Selected Areas in Communications, vol. 37, No. 9, 2019, pp. 2040-2052.
Simsek, A. et al., "A 140 GHz MIMO Transceiver in 45 nm SOI CMOS", 2018 IEEE BiCMOS and Compound Semiconductor Integrated Circuits and Technology Symposium (BCICTS), 2018, 28 pages.
Singh, P. et al., "Graphene-based plasmonic phase modulator for Terahertz-band communication", 2016 10th European Conference on Antennas and Propagation (EuCAP), 2016, 5 pages.
Tan, X. et al., "Enabling Indoor Mobile Millimeter-wave Networks Based on Smart Reflect-arrays", IEEE Infocom 2018—IEEE Conference on Computer Communications, 2018, 9 pages.
Tang, A. et al., "A 65nm CMOS 140 GHz 27.3 dBm EIRP transmit array with membrane antenna for highly scalable multi-chip phase arrays", 2014 IEEE MTT-S International Microwave Symposium (IMS2014), 2014, 3 pages.
Wu, B. et al., "On the Selection of the Number of Bits to Control a Dynamic Digital MEMS Reflectarray", IEEE Antennas and Wireless Propagation Letters, vol. 7, 2008, pp. 183-186.
Jornet, Josep Miquel, "Graphene-based Plasmonic Nano-Antenna for Terahertz Band Communication in Nanonetworks", IEEE Journal of Selected Areas of Communications/Supplement—Part 2 vol. 31, No. 12, Dec. 2013.

* cited by examiner

SMART METAL-GRAPHENE HYBRID REFLECTARRAY AT THZ FREQUENCIES

GOVERNMENT SUPPORT

This invention was made with government support under Grant Numbers 1955004 and 2011411 awarded by the National Science Foundation. The government has certain rights in the invention.

RELATED APPLICATIONS

This invention was made with government support under Grant Numbers 1955004 and 2011411 awarded by the National Science Foundation, and also under Grant Number FA8750-20-1-0500 awarded by the US Air Force Research Laboratories. The government has certain rights in the invention.

BACKGROUND

In a traditional communication system, control over the propagation characteristics of the electromagnetic radiation signal is generally assumed at the endpoints of the link (either at signal generation or at signal reception). The environment, or the channel, is assumed to be uncontrollable, and often considered as the detriment and limitation to signal propagation, for example in the form of obstacles blocking the signal, absorptive material causing energy loss, path loss due to distance, or any combination thereof.

While the concept of a controllable environment is a desirable trait, until recently, it was not an absolute necessity. Below the 6 GHz frequency spectrum, indoor communication is feasible without a controllable channel, with no great loss to system reliability. However, at sub-THz and THz frequencies (e.g., greater than 100 GHz), the impact of the channel may be substantial, and cannot be ignored or significantly overcome only through enhanced sophistication of the end nodes. As this frequency range is generally agreed upon to be a key part of next-generation wireless systems, the problem of an uncontrollable channel and possible solutions have attracted great attention. To this end, the utilization of intelligent reflecting surfaces (IRSs) to dynamically engineer attractive, synthetic communication links for reliable system performance is considered the most feasible solution.

SUMMARY

The embodiments of the invention described herein are directed to an intelligent reflecting surface (IRS) that reflects electromagnetic (EM) radiation at terahertz (THz) frequencies. The IRS may be composed of a hybrid metal-graphene reflectarray structure.

Embodiments of the invention described herein may comprise a hybrid radiating element that receives incident electromagnetic (EM) radiation, continuously manipulates its phase, and re-radiates phase-modified EM radiation. The hybrid radiating element is a combination of (i) a resonant, radiating antenna and (ii) a variable-length waveguide-based phase shifter. The resonant, radiating antenna may be a metallic patch antenna, and the variable-length waveguide-based phase shifter may be a graphene-based plasmonic modulator, which is configured as a stub associated with the metallic patch. The hybrid radiating element may be situated atop a layer of dielectric material, which is deposited on an electrically conductive ground plane. A voltage applied across the graphene stub and the ground plane controls the phase-modulation characteristics of the hybrid radiating element.

Other embodiments of the invention described herein may comprise an array of hybrid radiating elements constructed and arranged to form a reflectarray structure. The arrangement of the hybrid radiating elements of the reflectarray may be arranged such that the reflect array selectively and dynamically tailors the re-radiated EM signal with respect to the incident EM signal.

Embodiments of the invention may further comprise an intelligent reflecting surface (IRS) that combines a reflectarray of hybrid radiating elements with a control system that generates a set of control voltages to drive the hybrid radiating elements. The voltages may be determined so as to create a set of hybrid radiating element characteristics that, combined, results in a specific re-radiating characteristic of the reflectarray. The set of voltages may be varied continuously so that reflectarray re-radiating characteristic is dynamic.

A graphene-based plasmonic modulator is utilized for phase control in the described embodiments. Prior art smart reflectarrays generally utilize varactor diodes, PIN diodes, capacitors, or electronically tunable ionic liquids. Such devices, however, reach operational limits at sub-THz frequencies. Additionally, at THz frequencies, such phase control elements may be physically larger than the actual radiating elements themselves. Due to these reasons, smart (controllable) reflecting surfaces in the prior art have as yet not been demonstrated at THz frequencies.

While the prior art suggests the use of graphene itself for THz reflection, the described embodiments do not utilize graphene as the active reflecting material. Graphene-based reflecting designs are known to exhibit less efficiency than their metallic counterparts. In the described embodiments, the reflecting component is a metallic patch, and the phase control component is a graphene-based waveguide. Thus, the hybrid radiating element described herein efficiently performs both tasks of an ideal IRS.

The described embodiments control the useful properties of SPP waves on graphene through electrostatic biasing, and not through chemical doping. As described herein, the potential of Fermi energy on graphene can be continuously tuned, and thus continuous phase control is achievable. This is a useful distinction with respect to the prior art, as it allows any generic wavefront to be defined, such as near-field beamfocusing and Bessel beams for example, and not just conventional beamforming.

In one aspect, the invention may be a hybrid radiating element that comprises a metallic patch antenna and a graphene-based plasmonic modulator coupled to the metallic patch antenna. The graphene-based plasmonic modulator may be a graphene stub, coplanar with the metallic patch antenna and electrically coupled to the metallic patch antenna.

In another aspect, the invention may be a hybrid radiating element that comprises a dielectric substrate, an electrically conductive patch disposed on a top surface of the dielectric substrate, and a graphene stub also disposed on the top surface of the dielectric substrate. The graphene stub may be contiguous with, and electrically coupled to, the electrically conductive patch. The hybrid radiating element may further comprise an electrically conductive layer disposed on a bottom surface of the dielectric substrate.

In an embodiment, a first inlet and a second inlet may be formed in the electrically conductive patch along a first side of the electrically conductive patch, thereby forming a central stub of the electrically conductive patch between the first inlet and the second inlet. The graphene stub may be electrically coupled to the electrically conductive patch at the central stub.

The hybrid radiating element may further comprise an electrical conductor that is electrically coupled to the graphene stub. The electrical conductor may be configured to convey a control voltage to the graphene stub. The electrical conductor may extend through the dielectric substrate and the electrically conductive layer, with the electrical conductor electrically insulated from the electrically conducting layer.

The hybrid radiating element may further comprise a voltage source electrically coupled to the electrical conductor. The voltage source may be configured to apply a bias voltage through the electrical conductor to the graphene stub. The bias voltage is on the graphene stub with respect to the electrically conductive layer. The bias voltage may correspond to a specific phase delay of a surface plasmon polariton wave propagating in the graphene stub.

The thickness of the substrate may be greater than or equal to $0.0003\lambda_0$ and less than or equal to $0.05\lambda_0$, where $\lambda_0$ is a free space wavelength of EM radiation to be reflected by the hybrid radiating element. The hybrid radiating element may further comprise a hexagonal boron nitride layer disposed between the dielectric substrate and the graphene stub.

In another aspect, the invention may be a hybrid reflectarray that comprises an array of hybrid radiating elements. Each of the hybrid radiating elements may comprise (i) a dielectric substrate having a thickness, a top surface and a bottom surface, (ii) an electrically conductive patch disposed on the top surface of the dielectric substrate, (iii) a graphene stub disposed on the top surface of the dielectric substrate, where the graphene stub is contiguous with, and electrically coupled to, the electrically conductive patch (iv) an electrical conductor electrically coupled to the graphene stub, and (iv) an electrically conductive layer disposed on the bottom surface of the dielectric substrate. The array of hybrid radiating elements may be arranged in a grid pattern of M rows and N columns, where an individual hybrid radiating element may be designated by (m, n) and located in an $m^{th}$ row and an $n^{th}$ column of the array.

The hybrid reflectarray may have a center-to-center separation of immediately adjacent hybrid radiating elements that is substantially equal to $\lambda_0/2$, where $\lambda_0$ is the desired operating wavelength of the hybrid reflectarray. As described herein, a separation that is "substantially equal to $\lambda_0/2$" refers to an optimal separation of $\lambda_0/2$ with a possible deviation within practical fabrication tolerances. Further, it should be understood that a different center-to-center separation distance between immediately adjacent hybrid radiating elements may alternatively be used.

The electrical conductor for each of the hybrid radiating elements may extend through the dielectric substrate and the electrically conductive layer, and is electrically insulated from the electrically conducting layer. The electrical conductors from the hybrid radiating elements may together form a codebook port of M×N electrical conductors. The hybrid reflectarray may further comprise a codebook generator coupled to the codebook port. The codebook generator may generate a bias voltage signal for each of the M×N hybrid radiating elements, thereby producing a codebook set of bias voltages $V_{m,n}$, for m from 1 to M and for n from 1 to N.

The bias voltage signal for each of the M×N hybrid radiating elements may represent a weight $W_{n,m}$, associated with the hybrid radiating element in the $n^{th}$ column and the $m^{th}$ row and the of the array of hybrid radiating elements. The codebook set of bias voltages $V_{m,n}$ may comprise a set of beamforming weights. The set of beamforming weights may be of the form (beamforming weights)$\in[1e^{i0}, 1e^{82\pi}]$. The codebook set of bias voltages $V_{m,n}$ may comprise a phase transformation matrix. The phase transformation matrix may be configured to generate a desired wavefront. The phase transformation matrix may be configured to generate beamfocusing in the near-field. The phase transformation matrix may be configured to generate Bessel-beams.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
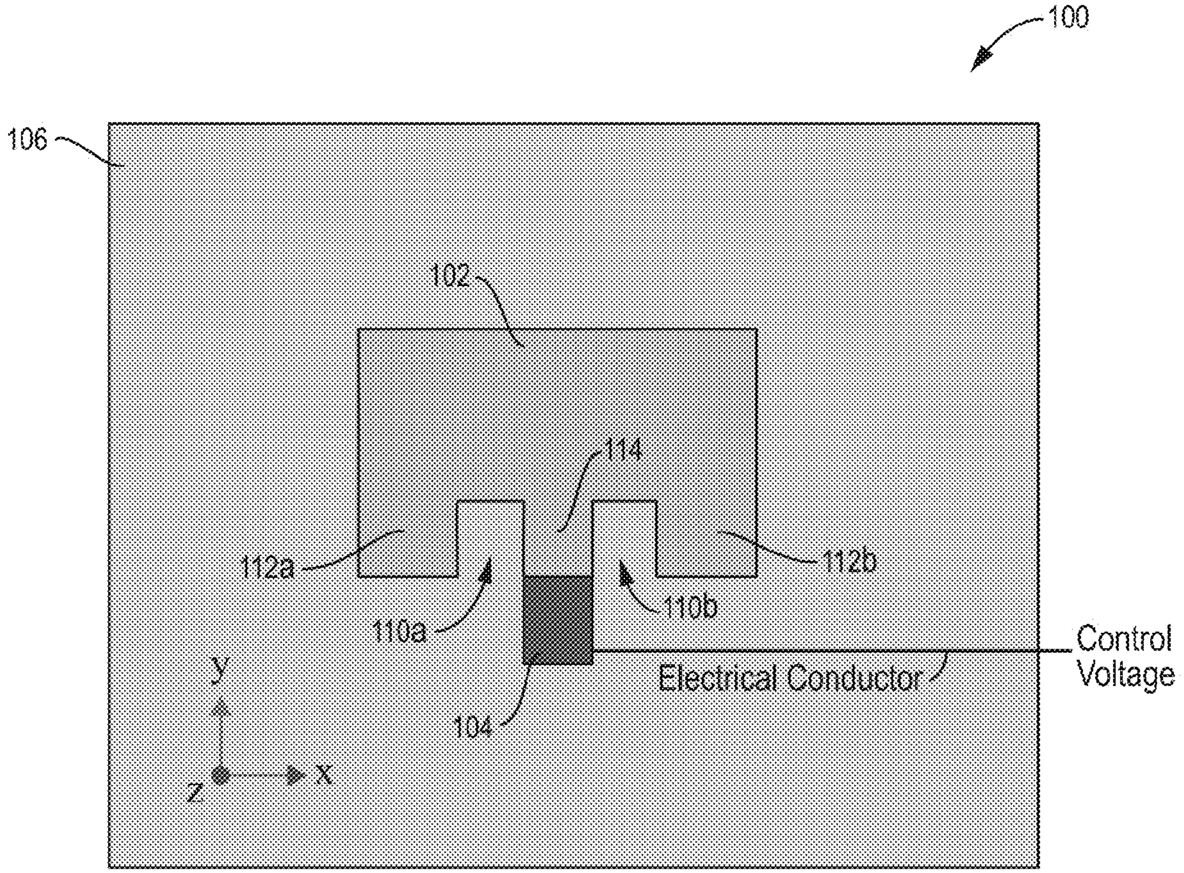
FIG. 1A shows a top view of an example embodiment of a hybrid radiating element according to the invention.

A description of example embodiments follows.

The teachings of all patents, published applications and references cited herein are incorporated by reference in their entirety.

A reflectarray is a passive antenna array that can receive and re-transmit electromagnetic (EM) radiation. The reflectarray intercepts an incident beam with a particular wavefront, and is utilized to transcribe a desired wavefront before reflecting the wave. For example, a reflectarray may intercept an incident beam from a particular angle of incidence, and re-radiate the same in another, predetermined, angle of reflection. Thus, reflectarrays can be used to facilitate Non-Line of Sight (NLoS) links, which are extremely important at terahertz (THz) frequencies. As future generation wireless standards are expected to operate at THz frequencies, a fully functional reflectarray at these frequencies is vital for overall system performance. For full functionality, a reflectarray should be able to dynamically intercept and transmit electromagnetic radiation from (and to) arbitrary angles of orientation.

Instead of (or in addition to) modifying the orientation of the reflected beam, the reflectarray may modify certain operational characteristics of the reflected beam. For example, the reflectarray may facilitate beamforming, beam focusing, and Bessel beams.

The ability to dynamically reconfigure communication links will be a necessary requirement in a mobile, varying network. To this end, dynamic phase shifters are required to tune the reflectarray response. Conventional tuning techniques that have been utilized at other frequencies (for example the mmWave domain) are not adaptable at THz frequencies, due to operational limits, size constraints, and limited tuning potential. The rising interest in plasmonic-physics governed devices, that operate intrinsically in the THz band, has been studied as a possible solution. However, while plasmonic devices at THz frequencies have gained increasing attention due to their intrinsic tunability, the reflection and radiation efficiency of plasmonic devices is far less than that of metallic devices, at THz frequencies.

In addition to reflectarray designs, metasurface designs have been considered as potential candidates for replacing/complementing reflectarrays for enabling environmental control. However, metasurfaces are generally trial and error solutions. While no solutions as of yet exist at the THz band that can perform dynamic link generation, proposed designs are notoriously limited in that a metasurface design is independent of any governing theory—changing any design parameter, such as the operating frequency, for example, could render the functionality of a design and derived operation null. Further, there is no clear metric for determining how the response of metasurface elements affects the operation of the entire metasurface as a whole—this induces a trial and error approach that is inefficient.

To overcome the above-mentioned limitations, the described embodiments comprise a hybrid metal/plasmonic device, constructed and arranged to be generalized to any required frequency within the THz band. Operation of a reflectarray, constructed and arranged using the hybrid metal/plasmonic device of the described embodiments as a basic building block, may be captured by deterministic equations and codebook application. The reflectarray of the described embodiments may be designed by a spatial distribution of the radiating elements, with center-to-center spacing of half a free-space wavelength ($\lambda_0/2$).

The advantages of the described embodiments stem from the hybrid approach. The features outperform the individual design prospects of both standalone metallic and plasmonic devices.

Demonstrated reflectarrays at THz frequencies, using standalone metallic designs, are "fixed" orientation designs. After fabrication, both the incident as well as the reflected angle cannot be changed. While this may be useful for feasibility studies and for studying the effects on the channel, the actual deployment of such reflecting surfaces of to stabilize the channel has limited usefulness. Any change in the link configuration, due to mobile node(s), will render the design and functionality redundant. In contrast, the hybrid design of the described embodiments can be configured to operate for any particular angle of incidence and serve any angle of reflection. Thus, the deployment of the device serves the requirements for a dynamic link setting.

Plasmonic only devices exploit the intrinsic tunability of graphene. Both reflectarray as well as metasurface designs have been proposed. However, plasmonic only devices work on plasmonic physics, which are governed by the manifestation of surface plasmon polariton (SPP) waves. SPP waves propagate at much lower velocities than regular EM waves at the same frequency, so the inherent mismatch between the SPP-EM wave velocity, as well as the miniaturized size of plasmonic only devices, makes them inefficient in passive, reflection-like settings. In contrast, the hybrid design of the described embodiments utilizes the plasmonic functionality of the graphene waveguide only in phase control, and thus the main reflection efficiency is unaffected.

The hybrid radiating element of an embodiment of the invention can be described as a combination of (i) a resonant, radiating antenna and (ii) a variable-length waveguide-based phase shifter, jointly designed for optimal performance. Independently, the resonant antenna may be considered as a metallic patch antenna, and the waveguide as a graphene-based plasmonic modulator. The jointly designed metallic patch and plasmonic waveguide are placed atop a layer of dielectric material, which is deposited on a metallic ground plane. The resonant properties of the metallic patch antenna facilitate interaction with the EM radiation, and the plasmonic waveguide provides continuous phase control. A reflectarray formed by a collection of such radiating elements may be used to implement any desired phase distribution across the reflectarray surface. The reflection efficiency of the described embodiments is much stronger than that of plasmonic-only devices, and complete phase control is possible, in contrast to metal-only devices.

The operation of the metallic patch antenna may be derived by classical EM theory, and the plasmonic waveguide operation may be derived by the dispersion equation, which relates the complex conductivity of graphene to the corresponding plasmonic wavelength. Graphene is a two-dimensional carbon material, with electrical properties that make it very well suited for propagating extremely high frequency signals. In addition, THz-frequency surface plasmon polariton (SPP) waves, which are key to the operation of the described embodiments, can propagate on graphene. SPP waves are highly confined EM waves generated at the interface of a conductor and dielectric, with wavelengths as much as orders of magnitude smaller than their free-space EM counterparts. Further, the properties of the SPP waves can be dynamically tuned by changing the conductivity of graphene. The use of graphene alone as a reflector is not feasible, because a mismatch between the momentum of SPP waves on graphene and the free-space EM waves leads to weak reflection strength of graphene elements, and ultimately poorly performing reflecting strategies.

The metallic patch receives an incident EM wave and converts it to an electrical signal, which generates SPP waves across the graphene waveguide surface. The SPP waves are reflected back at the open end of the waveguide, and the entire process is repeated in reverse, with the reflected wave being phase-tuned by the effective properties of the SPP waves. As the properties of the SPP waves are easily controlled, the phase of the reflected EM wave is also easily controlled.

Figure 1B:
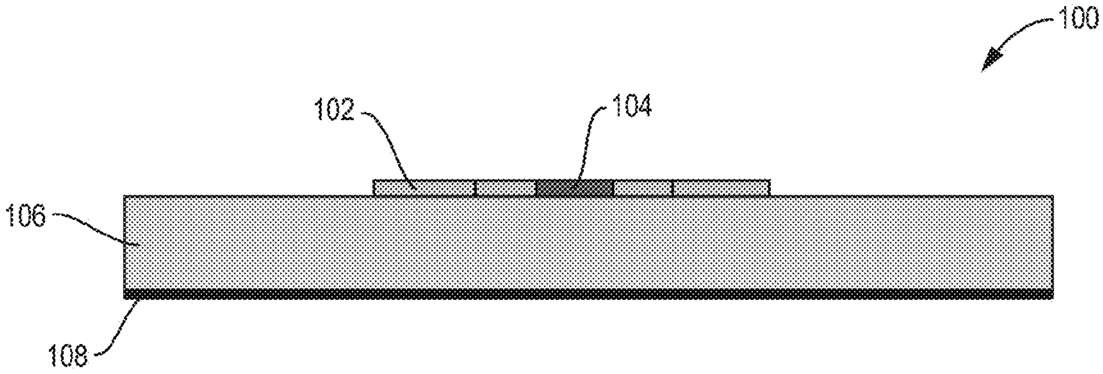
FIG. 1B shows a side view of the hybrid radiating element illustrated in FIG. 1A.
Figure 1C:
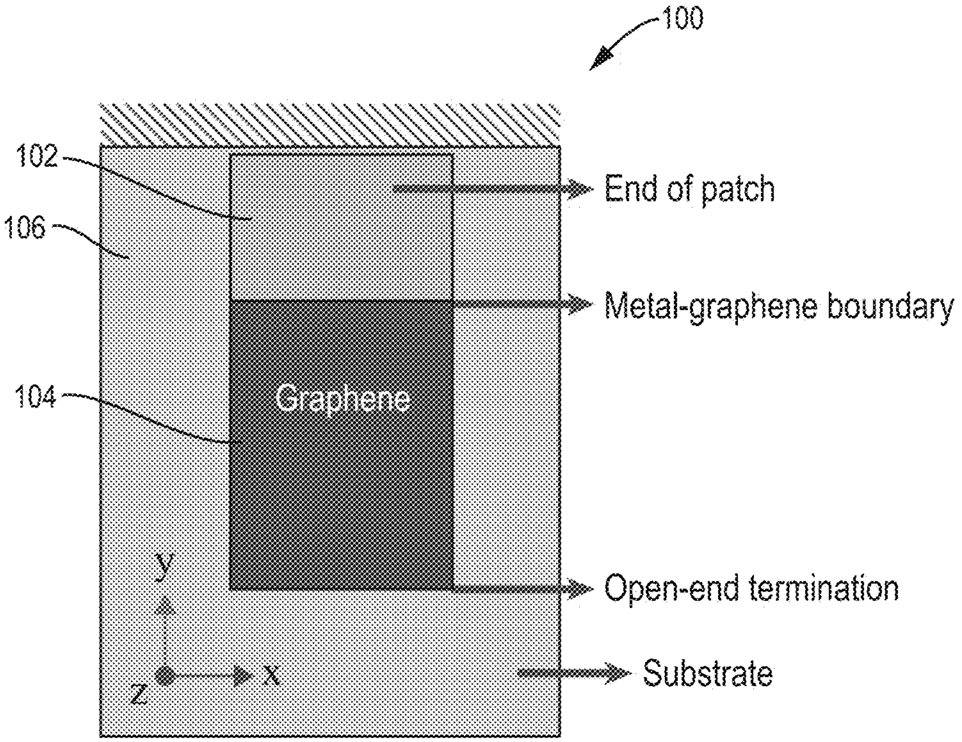
FIGS. 1C, 1D, 1E, and 1F show alternative views of an example hybrid radiating element according to the invention.

FIG. 1A shows a top view of an example embodiment of a hybrid radiating element 100 according to the invention. FIG. 1B shows a side view of the hybrid radiating element illustrated in FIG. 1A. This example embodiment is constructed and arranged to operate at a desired frequency of 1.5 THz, although the described parameters may be to accommodate other desired frequencies and frequency ranges.

The hybrid radiating element 100 may comprise a metallic patch 102 and a graphene stub 104 situated on a dielectric layer 106. In the example embodiment, the metallic patch 102 is rectangular, although other shapes suitable for a patch antenna may alternatively be used. The dielectric layer 106 is disposed on an electrically conductive layer 108 (e.g., a ground plane). In this example embodiment, the metallic patch 102 is gold, although alternative embodiments may employ a patch 102 that consists of a different electrically conductive material or alloy of electrically conductive materials. The ground plane 108 in the example embodiment shown is copper, although other electrically conductive materials may alternatively be used. The dielectric layer 106 in the example embodiment is silicon dioxide ($SiO_2$), although other dielectric materials known in the art may also be used.

The metallic patch 102 works as a broadside emitter on the basis of radiating slots. For optimal design efficiency at the desired frequency, the thickness of the substrate is in the range of $0.003\lambda_0$-$0.05\lambda_0$, where $\lambda_0$, is the free space wavelength of the reflected EM radiation. The reflection coefficient, or the S ii parameter, is the accepted performance metric for a patch antenna, where the lower the $S_{11}$ in transmission, the higher the efficiency. By the reciprocity principle, a good transmitting patch is also a good receiver. Since a reflectarray element is required to be a good receiver as well as a good transmitter, the metallic patch 102 so designed is a resonant reflectarray element. The dimensions of the metallic patch 102 are modelled from the cavity model equations (1), (2) and (3) below:

$$W = \frac{c}{2f_0\sqrt{\frac{\varepsilon_r+1}{2}}}, \tag{1}$$

-continued $$\varepsilon_{eff} = \frac{\varepsilon_r+1}{2} + \frac{\varepsilon_r-1}{2}[1+12h/W]^{-1/2}, \tag{2}$$

$$L = \frac{c}{2f_0\sqrt{\varepsilon_{eff}}} - 0.824h\left[\frac{(\varepsilon_{eff}+0.3)\left(\frac{W}{h}+0.264\right)}{(\varepsilon_{eff}-0.258)\left(\frac{W}{h}+0.8\right)}\right]. \tag{3}$$

Here, W and L are the width and the length, respectively, of the metallic patch 102 for operation at a desired frequency of $f_0$, h is the thickness of the dielectric substrate 106. $\varepsilon_r$ represents the dielectric constant of the substrate 106, and $\varepsilon_{eff}$ represents the effective dielectric constant. Because the electric fields of the metallic patch antenna 102 undergo fringing at the boundary of the substrate, $\varepsilon_{eff}$ may be given by:

$$\varepsilon_{eff} = \frac{\varepsilon_r+1}{2} + \frac{\varepsilon_r-1}{2}[1+12h/W]^{-1/2}.$$

Phase control is implemented through a graphene-based stub 104, which acts as a waveguide with an active graphene layer. The properties of the SPP waves generated in this waveguide are captured by the complex wave vector $k_{spp}$. More specifically, the plasmonic wavelength $\lambda_{spp}$ is dependent on the real part $\Re[k_{spp}]$, while the decay length $D_L$ is dependent on the imaginary part $\Im[k_{spp}]$:

$$\lambda_{spp} = \frac{2\pi}{\Re[k_{spp}]}, \tag{4}$$

$$D_L = \frac{1}{2\Im[k_{spp}]}. \tag{5}$$

The complex wave vector, as per the dispersion equation for SPP waves on graphene, is:

$$-i\frac{\sigma^g}{\omega\varepsilon_0} = \frac{\varepsilon_1+\varepsilon_2\coth(k_{spp}d)}{k_{spp}}. \tag{6}$$

In equation (6), $\sigma_g$ is the conductivity of graphene, $\varepsilon_1$ is the relative permittivity of the dielectric above graphene (air), $\varepsilon_2$ is the relative permittivity of the dielectric below graphene (silicon dioxide), and d is the separation between graphene stub 104 and the metallic ground plane 108. The conductivity model for graphene is given by equations (7) through (10):

$$\sigma^g = \sigma_{intra}{}^g + \sigma_{inter}{}^g. \tag{7}$$

At THz frequencies, the major contribution is through $\sigma_{intra}{}^g$, given as:

$$\sigma^g_{intra} = i\frac{2e^2}{\pi\hbar^2}\frac{k_BT}{\omega+i\tau_g^{-1}}\ln\left[2\cosh\left(\frac{E_F}{2k_BT}\right)\right], \tag{8}$$

Which can be further simplified to be:

$$\sigma^g_{intra} = \frac{\tau_g}{1-i\omega\tau_g}\left(\frac{e^2}{\pi\hbar^2}E_F\right). \tag{9}$$

In equations (7) through (9), $\omega=2\pi f_0$ is angular frequency of the reflected radiation, h is the reduced Planck's constant, e is the electron charge, $k_B$ is the Boltzmann constant, T is the temperature, $E_F$ refers to the Fermi energy of the graphene sheet, and $\tau_g$ is the relaxation time of electrons in graphene. The intrinsic properties of graphene, among them the relaxation time, are set as per numerous experimental characterizations of graphene known in the art.

An electrostatic bias is used to change the Fermi energy of the graphene layer, thereby modifying the SPP wave propagation speed. The change in propagation speed leads to a change in the phase of the SPP wave at the output of the stub. The total possible phase difference depends on both the actual physical length L of the stub, as well as the range of Fermi energy considered. This is seen in equation (10) below, where, for a physical length L of the stub, we derive the relative phase difference $\Phi_{12}$ between two SPP waves with different plasmonic wavelengths, the reference at $\lambda_{spp_1}$ for a Fermi energy $E_{F_1}$, and the other at $\lambda_{spp_2}$ for a Fermi energy $E_{F_2}$, to be:

$$\Phi_{12} = 2\pi\frac{L}{\lambda_{spp_1}}\left(1-\frac{\lambda_{spp_1}}{\lambda_{spp_2}}\right). \tag{10}$$

The hybrid radiating element 100 is obtained by combining the metallic patch 102 and the graphene stub 104. The metallic patch 102 converts the resonant incident wave to an electrical current, generating SPP waves which propagate across the graphene stub 104. The SPP wave travels across the length of the graphene stub 104 and back towards the metallic patch 102, before being radiated out as an EM wave. Following the transmission line theory of graphene, it is understood that changing the Fermi energy of graphene nano-ribbons causes a change in the characteristic impedance. Accordingly, a mismatch at the metal-graphene interface is expected. In the absence of active port elements, the mismatch cannot be studied and accounted for, so a numerical analysis is conducted to determine the jointly optimized design. The resulting example hybrid radiating is depicted in FIGS. 1A and 1B, with the geometry optimized as per the above-outlined principle.

In an example embodiment of the hybrid radiating element 100, metal may be excised from the patch 102, along one side of the patch 102, to form two inlets 110*a*, 110*b*, thereby resulting in two outer stubs 112*a*, 112*b*, and a center stub 114. The center stub 114 is the same width as the graphene stub, and is contiguous with and electrically coupled to the graphene stub 104. The dimensions of the example embodiment of a hybrid radiating element 100 are summarized in Table I:

TABLE 1

Hybrid Element Dimensions

| | |
|---|---|
| Substrate thickness | 2.3 μm |
| Substrate permittivity | $4\varepsilon_0$ |
| Patch width | 63.2 μm |
| Patch length | 49.94 μm |
| Stub length | 15 μm |
| Stub width | 10 μm |
| Inlet width | 9 μm |
| Inlet length | 18 μm |
| Graphene relaxation time | 1 ps |

Figure 1D:
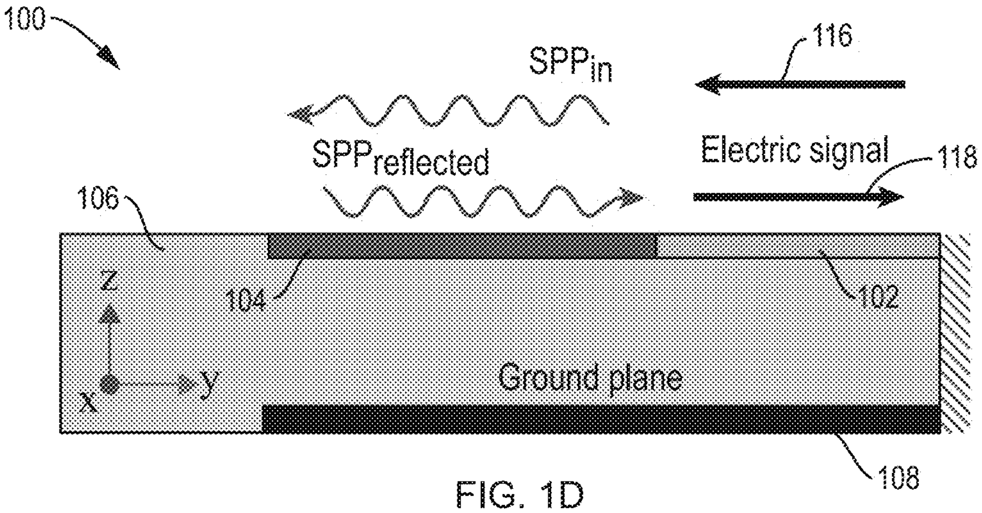

FIGS. 1C, 1D, 1E, and 1F show alternative views of an example hybrid radiating element 100. FIG. 1D illustrates an electrical signal 116 generated by an incident EM wave arriving at the metallic patch 102, and the $SPP_{in}$ generated when the electrical signal 116 encounters the metal-graphene boundary. FIG. 1D further shows the $SPP_{reflected}$ signal that is caused by the open-end termination of the graphene stub 104, and the electrical signal 118 generated when the $SPP_{reflected}$ signal encounters the graphene-metal boundary.

Figure 1E:
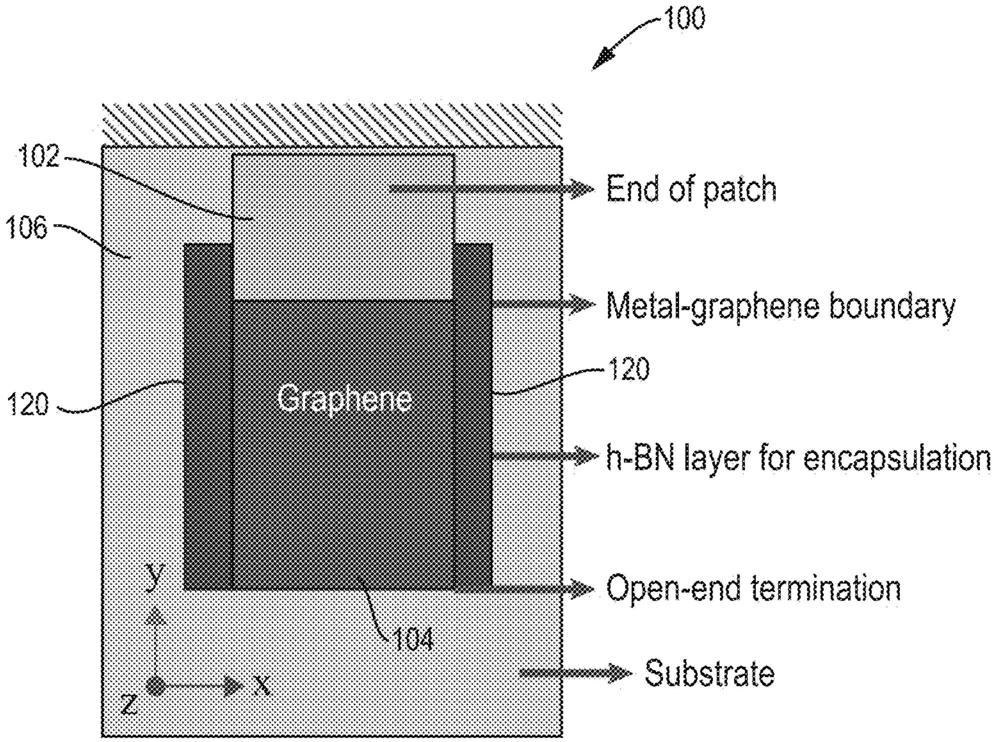
Figure 1F:
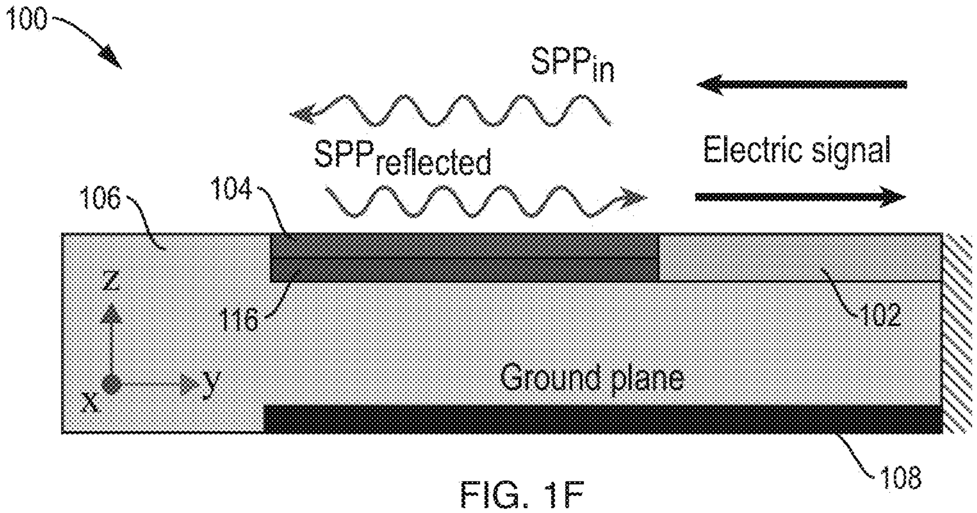

FIGS. 1E and 1F show the hybrid radiating element 100, except with a hexagonal boron nitride (h-BN) layer for encapsulation of the graphene stub to enhance the quality (relaxation time) of the graphene. Graphene and h-BN have the same atomic structure, but h-BN has a 1.8% longer lattice constant. As a substrate, h-BN greatly improves the mobility of charge carriers in graphene compared to $SiO_2$ substrates.

Figure 2:
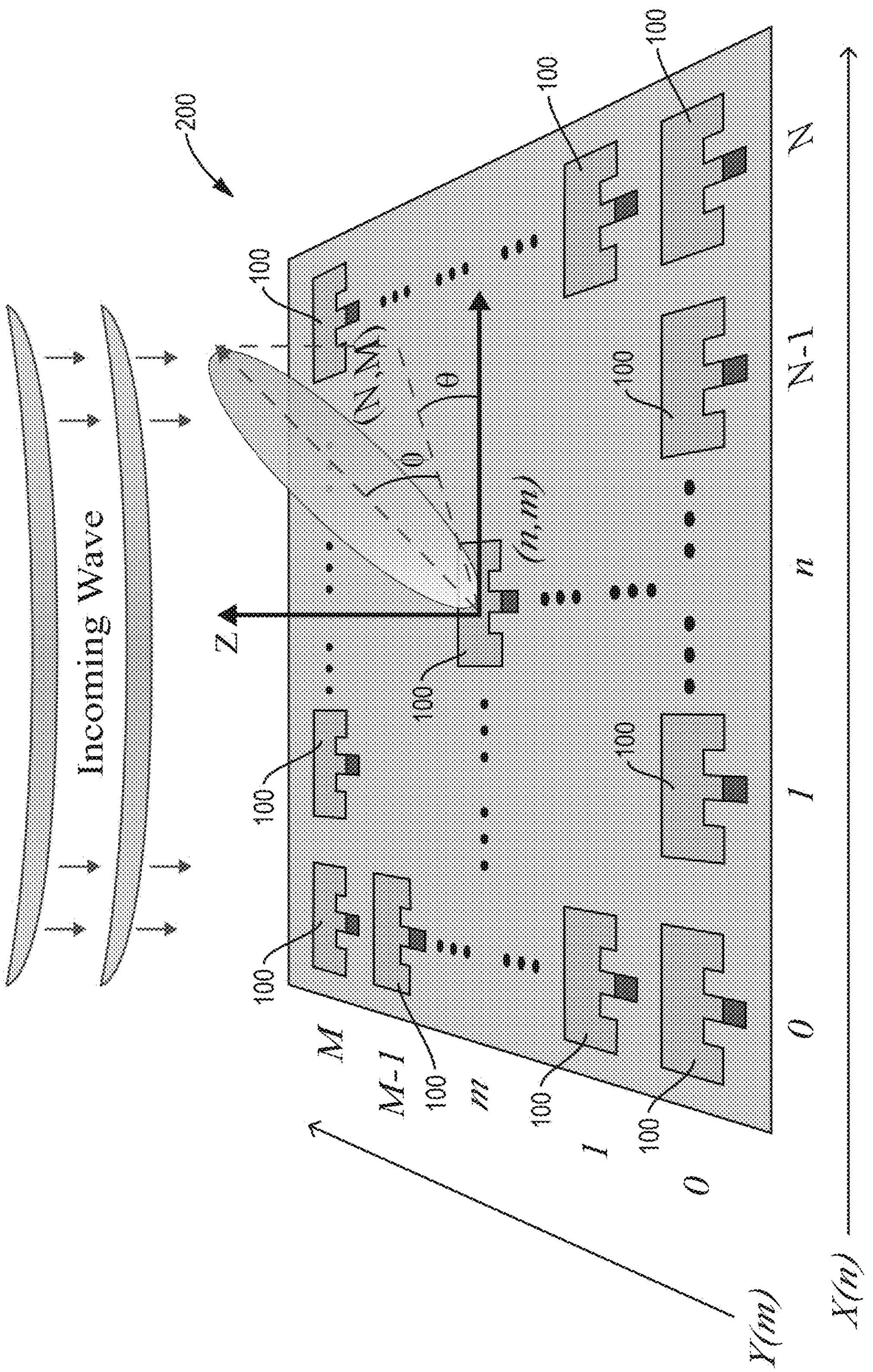
FIG. 2 illustrates an example embodiment of a hybrid reflectarray according to the invention.

FIG. 2 illustrates an example embodiment of a hybrid reflectarray 200 according to the invention. The architecture and operation of the hybrid reflectarray 200 is based conventional array theory. In this example embodiment, the hybrid radiating elements 100 are distributed with a center-to-center separation of $\lambda_0/2$, where $\lambda_0$ is the desired operating frequency of the hybrid reflectarray 200. This spacing minimizes mutual coupling effects without creating grating lobes, resulting in negligible mutual coupling effects. It should be understood, however, that other center-to-center separation distances may alternatively be used.

The hybrid reflectarray 200 may be excited by an external radiation source. Each element 100 of the hybrid reflectarray 200 is designed to have a certain beamforming weight, assigned through the application of a codebook. The resultant beam from the complete superposition of all the weighted elements is steered to the desired direction (θ, ϕ). For the planar hybrid reflectarray 200 shown in FIG. 2, to direct an incident wave with free-space wavenumber of $k_0$ towards a direction (θ, ϕ), the progressive phase delay between the elements separated by a distance d needs to be $\Phi_{RA}$, where $$\Phi_{RA}=k_0(R_i-d\sin\theta(x_i\cos\phi+y_i\sin\phi)). \tag{11}$$

The correction term $k_0R_i$ is added to account for the incremental inherent phase delay from the incidence angle of the beam. When the incoming wave is broadside, the correction term is rendered void.

To implement the required phase delay of each element at position n, m radiating element of the hybrid reflectarray 200 in FIG. 2 as per Eq. (11), a codebook is defined, composed of effective weights of $W_{n,m}$, corresponding to the n, m element. $W_{n,m}$ is of the form $Ae^{iB}$, where A represents the magnitude of signal strength, and B represents the relative phase. The hybrid reflectarray 200 is intended for phase control. Thus, it is clear that for a complete continuous beamformed array, the weights required are of the form $$W_{codebook}\in[1e^{i0},1e^{i2\pi}]. \tag{12}$$

The application of the derived codebook to the reflectarray 200 results in the reflection of the incident wave in the particular desired direction. In the hybrid reflectarray 200, the codebook is applied by varying the Fermi energy of the graphene stub $EF_{stub_{n,m}}$. Thus, the effective complex weight $W_{n,m}$ is mapped to a particular stub Fermi energy of that element:

$$W_{n,m}\mapsto EF_{stub_{n,m}}. \tag{13}$$

Figure 3:
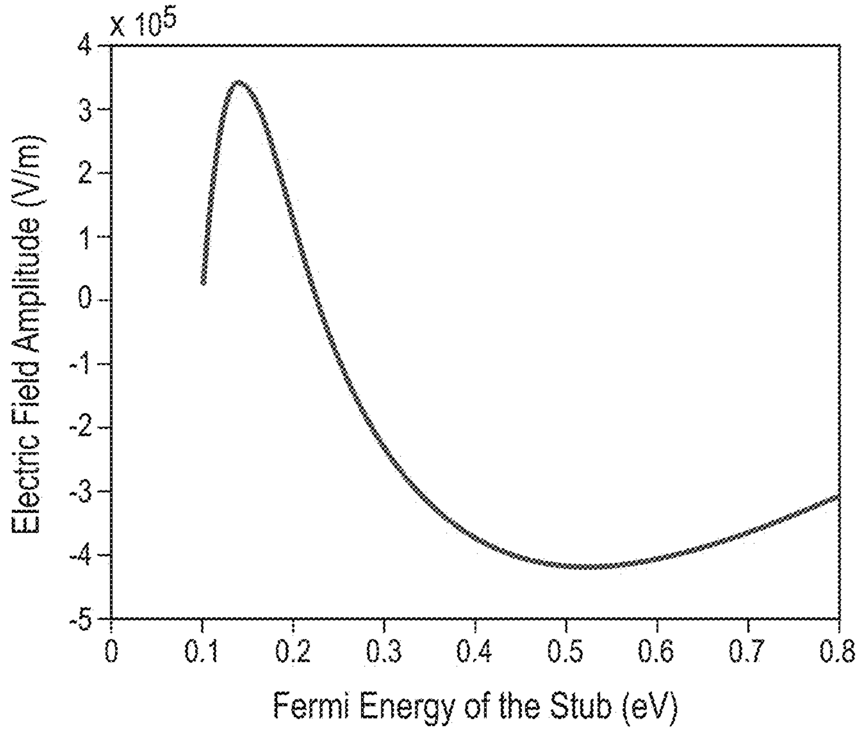
FIG. 3 shows the variation of the electric field amplitude at the output of the stub is found as a function of the Fermi energy of the graphene stub.

To implement the codebook, the relationship between the Fermi energy of the stub and the relative phase delay is required. To develop this, the variation of the electric field amplitude at the output of the stub is found as a function of the Fermi energy of the graphene stub, through full wave analysis of a single hybrid element, under transmission mode. This relation is presented in FIG. 3. It is seen that at different Fermi energy levels (all within the common range between 0.1 eV and 1 eV), the corresponding output fields will exhibit a phase difference exceeding π radians. In reflection, the phase difference is doubled, and therefore complete phase control with 2π radians is achievable.

Figure 4:
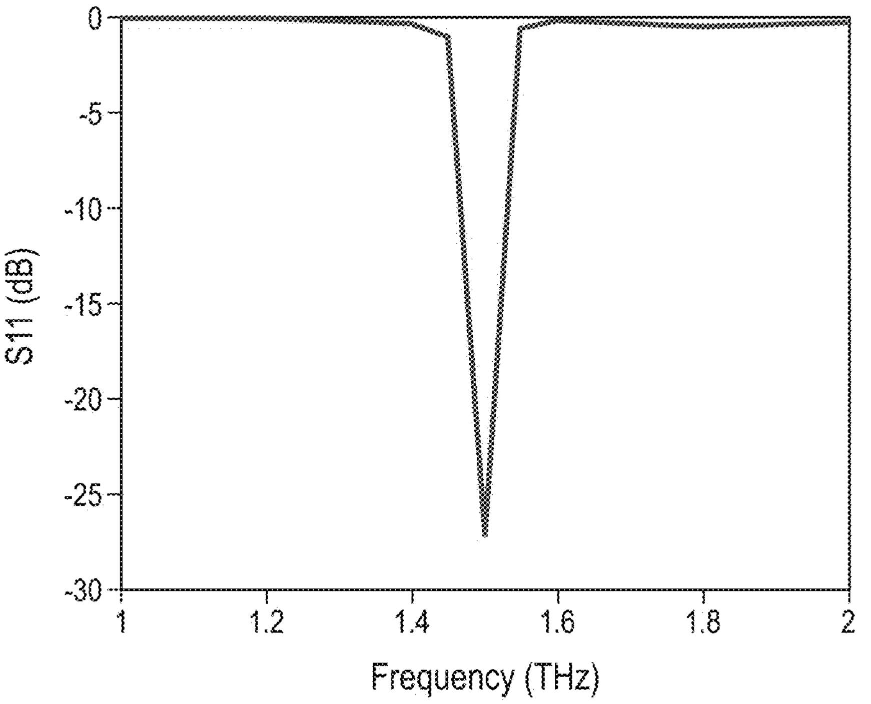
FIG. 4 represents the relationship between the $S_{11}$ parameter and the operating frequency of the hybrid element.

FIG. 4 represents the relationship between the $S_{11}$ parameter and the operating frequency of the hybrid element, through discrete port excitation at the input end of the graphene stub (transmission mode). At 1.5 THz, the $S_{11}$ parameter is −27 dB, which indicates resonance. The hybrid element can be tuned to any other resonant frequency in the THz band.

Figure 5:
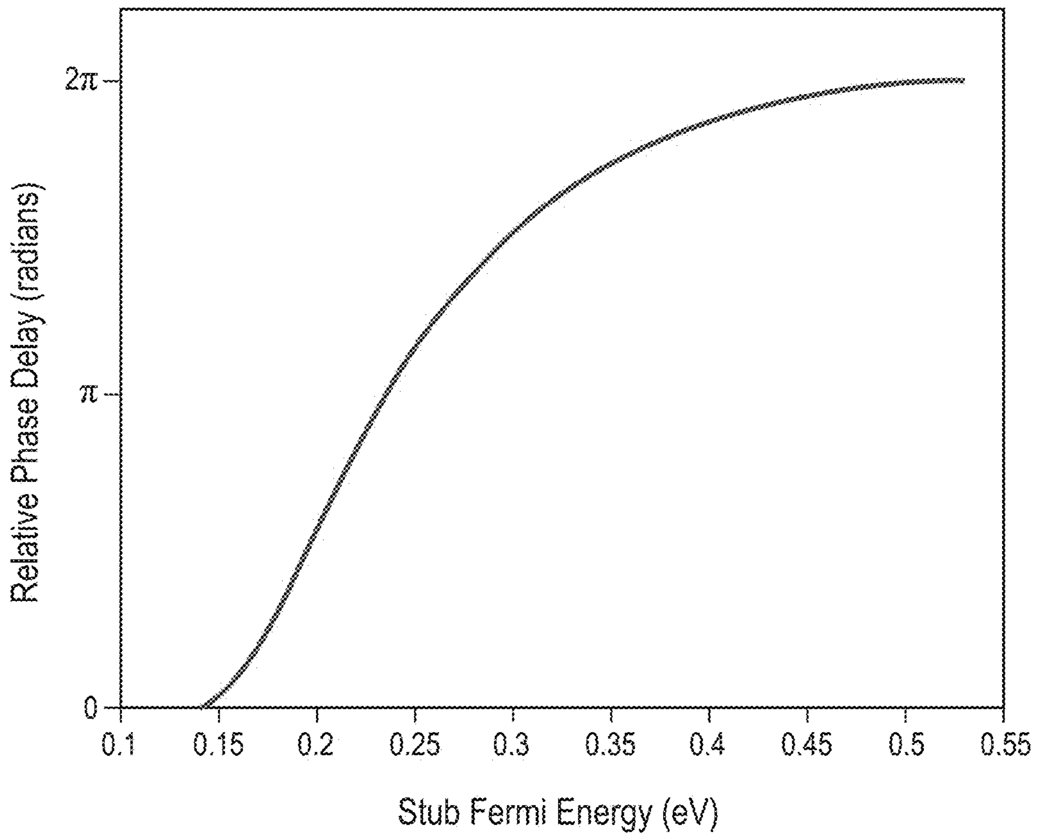
FIG. 5 shows the derived relation between the Fermi energy of the graphene stub and the relative phase delay.
Figure 6:
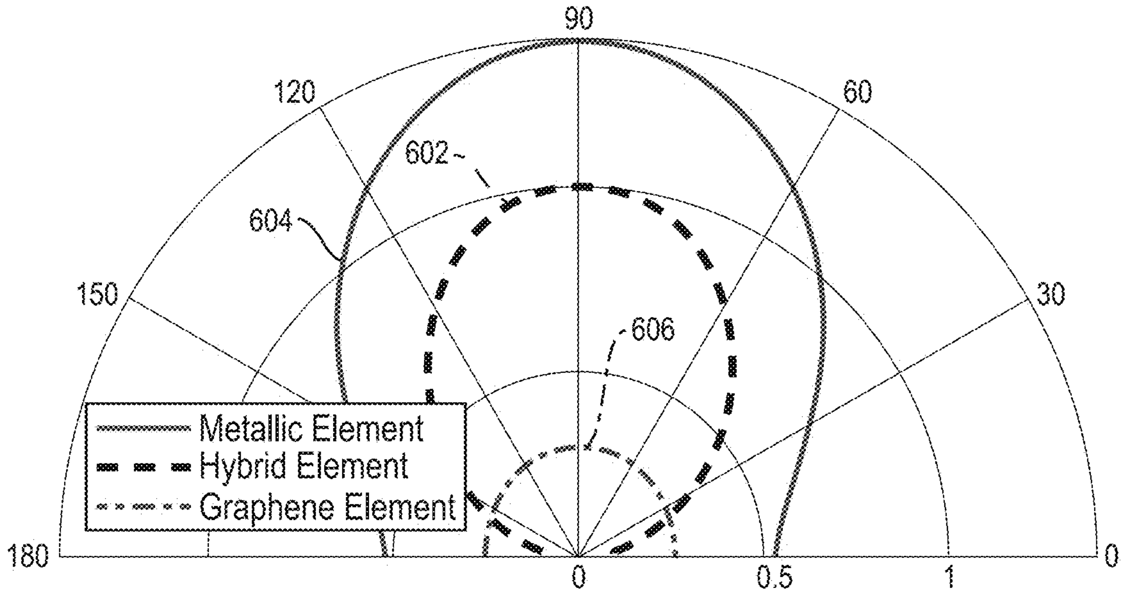
FIG. 6 shows a comparison of the magnitude of reflection of the hybrid element with that of a metallic patch and a graphene patch.

FIG. 5 shows the derived relation between the Fermi energy of the graphene stub and the relative phase delay. FIG. 5 demonstrates that within the range of 0.14 eV to 0.55 eV, continuous and complete phase control is achieved. FIG. 6 shows a comparison of the magnitude of reflection of the hybrid element 602 with that of a metallic patch 604 and a graphene patch 606, all resonant at the same frequency (1.5 THz). It is seen that the metallic patch 604 provides the strongest reflection, but, as described herein, does not have any tunability. The graphene patch 606 suffers a severely weakened reflected signal due to mismatch in the momentum of SPP and EM waves, as previously discussed. The hybrid element 602 has slight power attenuation compared to the metallic patch 604, due to power dissipation across the stub, but accommodates complete beamforming support.

Figure 7:
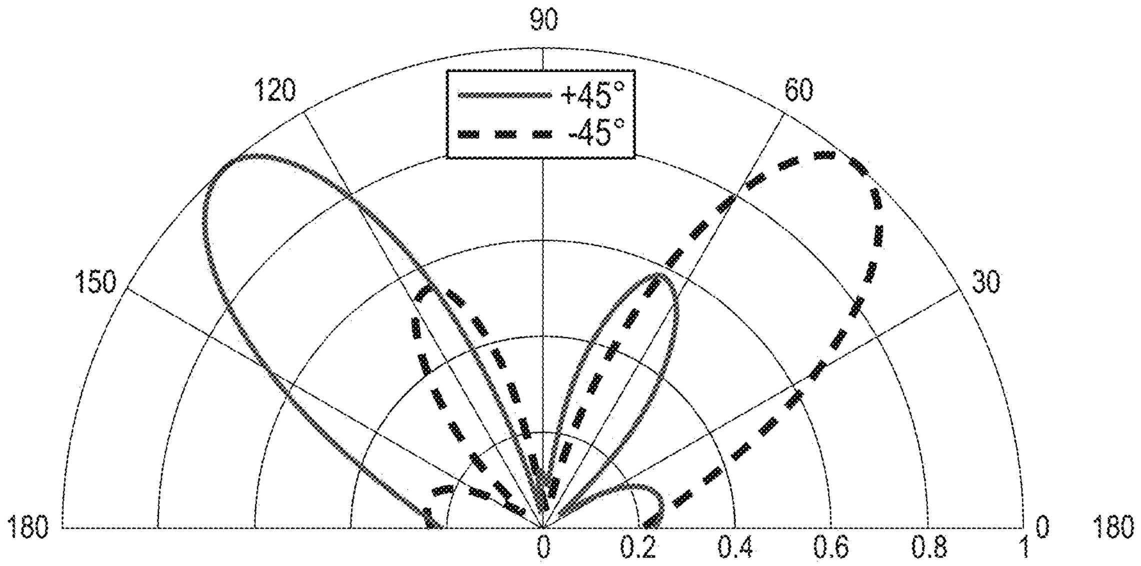
FIG. 7 shows the range of angles for which the described embodiments of a hybrid reflectarray can competently steer a normally incident plane wave.
Figure 8:
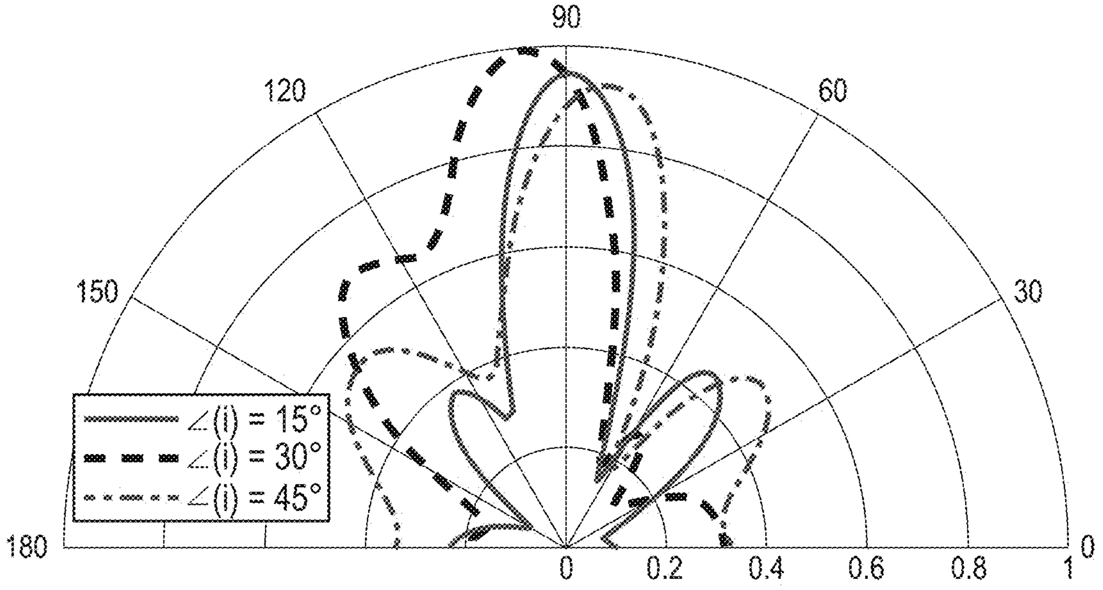
FIG. 8 illustrates the ability of the reflectarray to accommodate non-normal incident beams from different angles of incidence, and steer these in any pre-determined direction (broadside in this instance).

FIG. 7 shows the range of angles for which the described embodiments of a hybrid reflectarray can competently steer a normally incident plane wave. As shown, the hybrid reflectarray can provide up to 90° of continuous scanning across the broadside. Beyond this range, the limitations of the patch antenna start to manifest and result in truncated reflection strength. The ability of the reflectarray to accommodate non-normal incident beams from different angles of incidence, and steer these in any pre-determined direction (broadside in this instance) is shown in FIG. 8. It is seen that for incident beams at as much as an angle of +/−45° from the broadside, the reflectarray can direct the reflected beam broadside.

Figure 9:
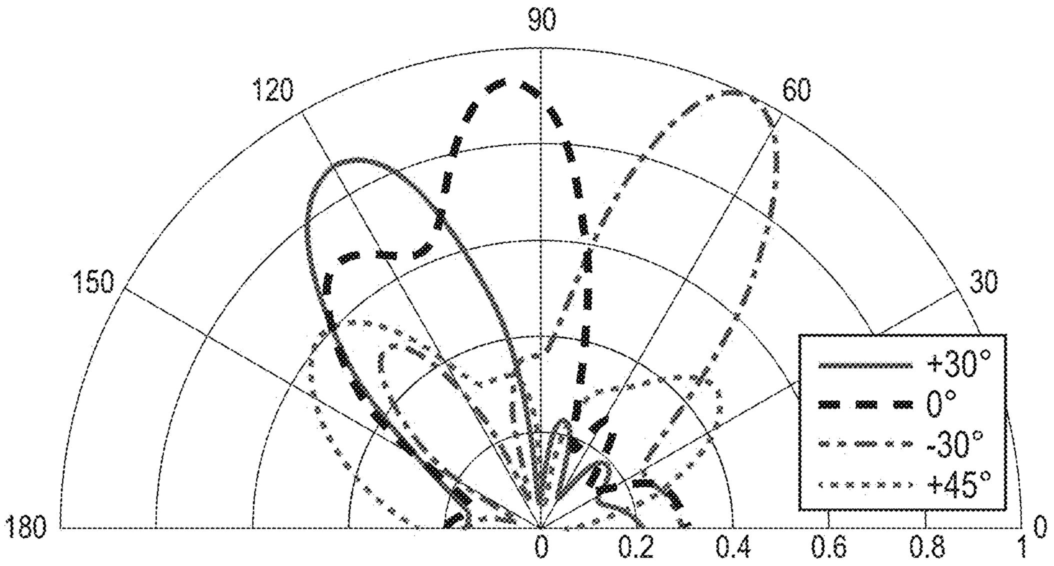
FIG. 9 highlights the ability of the reflectarray to engineer multipurpose, multi-directional links, and steer a beam from any angle of incidence to any other controlled angle of reflection.

FIG. 9 highlights the ability of the reflectarray to engineer multipurpose, multi-directional links, and steer a beam from any angle of incidence to any other controlled angle of reflection. The reflectarray can direct an incident beam (at 30° in this case) towards multiple directions; specular (+30°), broadside (0°), retraced)(−30°, or even to other arbitrary directions (such as +45° here). While the efficiency of the array is certainly diminished at the operational limits of beamsteering, this capability is essential to establish dynamic multipath links and help realize UM-MIMO at THz frequencies.

Figure 10:
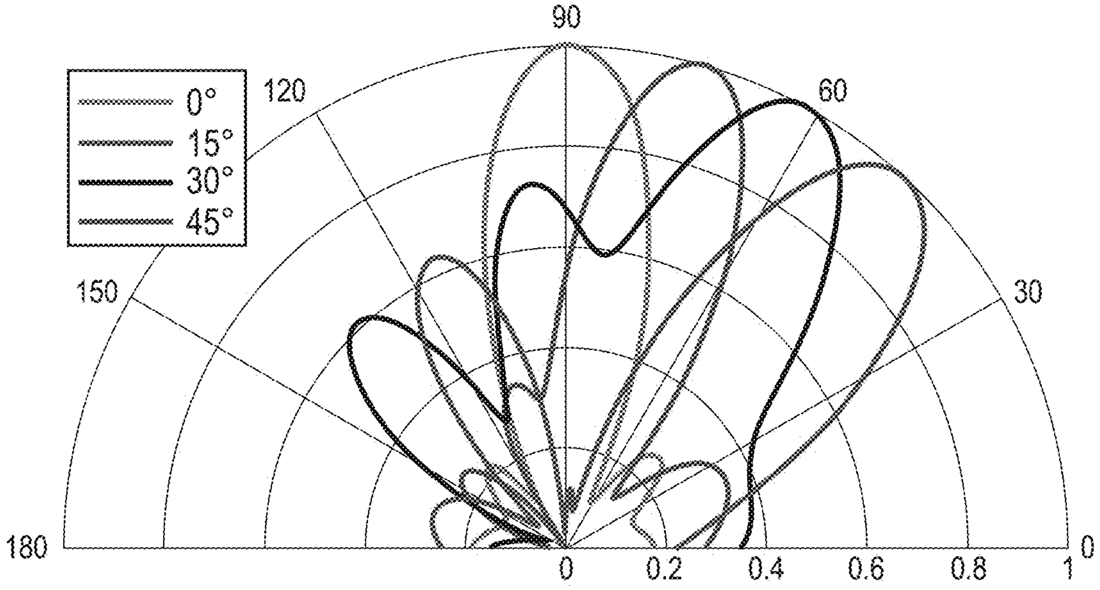
FIG. 10 shows the resultant far-field radiation patterns, for an example 4×1 hybrid reflectarray, of the reflected beam obtained using four different codebooks.

FIG. 10 shows the resultant far-field radiation patterns, for an example 4×1 hybrid reflectarray, of the reflected beam obtained from the implementation of the four different codebooks C0, C1, C2, and C3, designed to reflect a normal incident plane wave towards (θ, ϕ)=(0°,0°), (0°,15°), (0°, 30°), and (0°,45°), respectively. Table II presents the derived codebooks. It is seen that the hybrid reflectarray successfully reflects the beam in the intended directions.

TABLE II

The Derived Codebooks

| | Fermi Energy of Stubs | | | |
|---|---|---|---|---|
| Codebooks | $EF_{stub_{0,0}}$ | $EF_{stub_{1,0}}$ | $EF_{stub_{2,0}}$ | $EF_{stub_{3,0}}$ |
| C0 | 0.5 eV | 0.5 eV | 0.5 eV | 0.5 eV |
| C1 | 0.14 eV | 0.176 eV | 0.198 eV | 0.212 eV |
| C2 | 0.14 eV | 0.197 eV | 0.232 eV | 0.3 eV |
| C3 | 0.14 eV | 0.208 eV | 0.287 eV | 0.159 eV |

Operation of the reflectarrays of the described embodiments is equivalent to an aperture system that intercepts an incident wave and transcribes a desired wavefront on it. Thus, in the absence of active elements, with dynamic phase control of the hybrid reflectarray as described herein, the hybrid reflectarray of the described embodiments acts as a dynamically adjustable phase transformation matrix.

Figure 11:
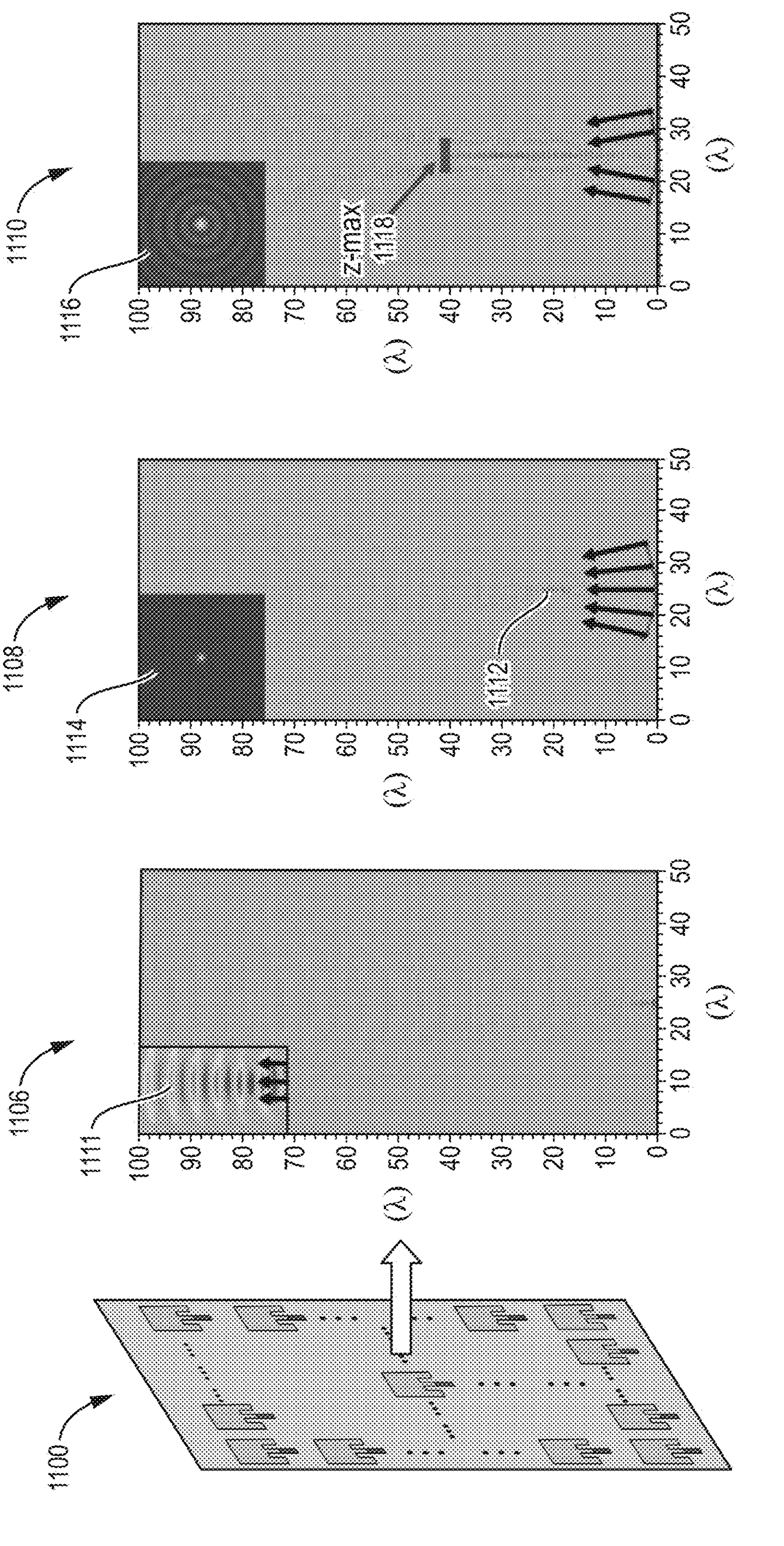
FIG. 11 illustrates an example reflectarray functioning as a transformation matrix.

The reflectarray of the disclosed embodiments may operate, for example, in three modes of operation as described below. Referring to FIG. 11, an example reflectarray 1100 (as described with respect to FIG. 2) may function as a transformation matrix, producing the near and far field radiation as shown in EM radiation maps 1106, 1108, 1110.

(I) Beamforming—the hybrid reflectarray may be facilitate beamforming through a phased array operation. The characteristic propagating wavefront is observed in EM radiation map 1106 of FIG. 11, with inset 1111 showing a zoomed perspective. By assuming far-field operation, the link configuration is specified through the angles of orientation. The approximate path (and corresponding phase) differences for each hybrid radiating element of the reflectarray, dependent on the angles of orientations, can then be countered by a linear progressive phase shift, wrapped around 2π radians. Within the far-field, the maximum possible discrepancy through this simplification is limited to π/8 radians.

(II) Beamfocusing—While beamforming is suitable in the far field, a viable approach at any distance from the reflectarray 1100 is beamfocusing. If the exact position of the TX and RX target is known (where TX is a transmitter that transmits an EM signal to the reflectarray 1100, and RX is a receiver that receives a signal reflected from the reflectarray 1100), it is possible to create a phase transformation that generates a wavefront that converges exactly at the RX position. The required phase shifts are exact conjugates of the individual path distance from each element to the RX. EM radiation map 1108 of FIG. 11 presents an example of this scenario. As is shown, the convergence occurs at a specific spot 1112. The inset 1114 shows the beam profile, with the resolution (beam-spot) governed by the Abbe limit.

(III) Bessel Beams—The beamforming and beamfocusing modes of operation both have specific limitations. With beamforming, the far-field requirement will result in an inaccurate phase correction matrix within the near-field, leading to reduced efficiency. With beamfocusing, the wavefront converges (collimates) at a specific spot, requiring precise location estimates. A codebook for the reflectarray may be developed where, within the near-field, deterministic propagation and collimation is fulfilled. To this end, some of the described embodiments incorporate Bessel beams. To realize Bessel beams, the aperture can be leveraged to mimic plane waves travelling inwards on a cone, an example of which is presented in EM radiation map 1110 of FIG. 11, which shows that a beam characterized by a non-diffracting central spot along the central axis of the so-defined cone, with concentric rings around it. The beam profile is shown in the inset 1116. The maximum distance $Z_{max}$ 1118, over which the beam retains this non-diffracting pattern is directly related to the aperture size, the central spot size, and the frequency of the signal. Beyond $Z_{max}$ 1118, the beam quickly dissolves into a diverging ring.

Bessel beams possess extremely interesting properties. Among others, the power and information carried in each ring of the Bessel beam, and the central spot size, is the same (with a much greater intensity within the central spot than any of the rings). Thus, even if an obstruction compromises portions of the beam profile, the information and propagation of the Bessel beam remain largely unaffected, which is why Bessel beams are also referred to as self-healing beams. In addition, higher order Bessel beams contain orbital angular momentum (OAM), which is one of the most widely researched topics for increasing data rates and spectrum efficiency due to the natural orthogonality between different OAM modes.

The potential benefits Bessel beams are that, unlike beamforming, Bessel beams can operate within the near field, and, unlike beamfocusing, Bessel beams are valid across an axis of propagation. The gain from the Bessel beam can be estimated by considering the number of concentric rings that the RX target, depending on its size, may receive. At the least, by ensuring that the central spot size is designed wide enough to have, at minimum, the power required to provide the threshold signal to noise ratio (SNR) for a desired bit error rate (BER) communication scheme, robust performance will be guaranteed. Additionally, the limited propagation distance can be leveraged to add a self-sufficient layer of security, since eavesdroppers not focused within the central spot would need to intercept divergent, ring-like wavefronts, clearly a non-trivial task.

The following paragraphs present a performance comparison between the above-referenced modes of operation of the described embodiments, dependent on the link distance and carrier frequency.

as the norm of the reflectarray steering factor generated by the codebook, coupled to the actual path distances that it is intended to account for, normalized to the reflectarray size. In this manner, the effects of both the TX→reflectarray and IRS→reflectarray codebook implementations are completely captured. By its definition, the maximum value of $EF_{IRS}$ is 1, at highest efficiency. The Bessel beam characteristics can be generated to ensure that the RX will receive, at minimum, the power needed for error-free communication within the central spot, and the maximum central spot size is the size of the RX. Owing to the relation between the central spot size and the non-diffracting nature of Bessel beam propagation, the $EF_{IRS}$ in the case of Bessel beams is then valid up till $Z_{max}$, the maximum distance over which the beam is non-diffracting.

To adequately elaborate upon the complex relationships between communication requirements, reflectarray design, codebook efficiency, and corresponding beamwidth, a setup is defined as follows: For characterizing the trend across the entire THz band, three design frequencies are established—130 GHz, 300 GHz and 1 THz. Further, a large indoor setting is considered whereby, for simplicity, the TX is assumed to be at a distance of 12 m from the reflectarray—a reasonable distance. The reflectarray→RX distance is then adjusted to incorporate a changing cascaded link distance, with no direct line of sight (LoS) between TX and RX. The TX→reflectarray and reflectarray→RX links are assumed feasible. The following three scenarios are considered to determine the reflectarray size and the remaining design parameters that then follow:

Scenario 1: TX-RX pair are designed similarly (maximum gain with a physical size of 1 mm), regardless of design frequency.

Scenario 2: The RX is considered as a unitary gain device.

Scenario 3: The far-field distance of the reflectarray is fixed to the TX→reflectarray distance, regardless of design frequency.

The combined gain of the end nodes and the corresponding required reflectarray gain under the scenarios outlined above are summarized in Table III.

TABLE III

Required reflectarray Size (N × N elements) and Far-Field Distance

| | Design Frequency | | | | | | | | | | | |
|---|---|---|---|---|---|---|---|---|---|---|---|---|
| | 130 GHz | | | | 300 GHz | | | | 1 THz | | | |
| Scenarios | TX-RX Gain | IRS Gain | N | Far-field | TX-RX Gain | IRS Gain | N | Far-field | TX-RX Gain | IRS Gain | N | Far-field |
| 1 | 17.46 dB | 39.26 dB | 51 | 2.87 m | 31.96 dB | 32.26 dB | 23 | 0.24 m | 52,84 dB | 44.4 dB | 93 | 1.27 m |
| 2 | 9.73 dB | 46.99 dB | 126 | 17.96 m | 16.98 dB | 47.24 dB | 129 | 8.17 m | 27.42 dB | 69.83 dB | 1747 | 457.17 m |
| 3 | N.A. | 45.02 dB | 103 | 12 m | N.A. | 48.83 dB | 156 | 12 m | N.A. | 54.01 dB | 283 | 12 m |

For a given TX→reflectarray→RX link distance and frequency dependent propagation loss, the SNR value at the RX depends on the input power, the noise power spectral density and bandwidth, the gain at the end nodes, and the number of elements and efficiency of the reflectarray. The reflectarray efficiency can be succinctly described as a measure of how well the applied codebook compensates for the actual phase differences between individual wavefronts of every individual reflectarray element, the sum total of which governs the reception (transmission) from (to) the TX (RX). The reflectarray efficiency factor, $EF_{IRS}$, is then found The information in Table III reveals an interesting insight. The total gain (TX+reflectarray+RX) required for high data-rate error-free communication increases with the design frequency. However, under certain conditions, with increased end-node(s) complexity, the reflectarray requirement may be less demanding for higher frequencies. This is evident in the reflectarray requirements under Scenario 1, for 130 GHz and 300 GHz.

Dependent on the requirements of the gain, the corresponding beamwidth and spot size under the different modes of operation can be evaluated and compared. These can be defined through the 3-dB beamwidth for beamforming, the Abbe resolution limit for beamfocusing, and the predetermined central spot size for Bessel beams.

Scenario 1: Under the considerations of Scenario 1, the end nodes exhibit higher gain at larger design frequencies. The reflectarray is designed following the methodology described herein, and the parameters are presented in Table III. The efficiency of an IRS ($EF_{IRS}$) of each reflectarray design under the beamforming, beamfocusing, and Bessel Beam modes of operation discussed herein are presented in FIG. 12. With perfect localization, beamfocusing operation always provides maximum efficiency, with the $EF_{IRS}$ constant at 1, regardless of design frequency and link distance. Due to the reduced complexity of the reflectarray, and the corresponding small electrical size, the far-field distance is small. Thus, $EF_{IRS}$ under beamforming operation converges to the maximum for all frequencies at short link distances. It is important to note that the beamforming efficiency for the frequencies converges to the maximum (of 1) at a rate dependent on the corresponding far-field distance. Thus, counter-intuitively, beamforming operation at 1 THz improves faster than that at 130 GHz. Observing Bessel beam efficiency, it is seen that up until the maximum propagation distance, Bessel beams can match the efficiency of beamfocusing—the knowledge of the central axis of propagation completely captures the required phase compensation criteria. However, due to the minuscule electrical size of the reflectarray, the range of the Bessel beam is confined. Nonetheless, the propagation distance is greater for higher frequencies, and the furthest propagation distance, for 1 THz is marked for a better perspective.

Figure 12:
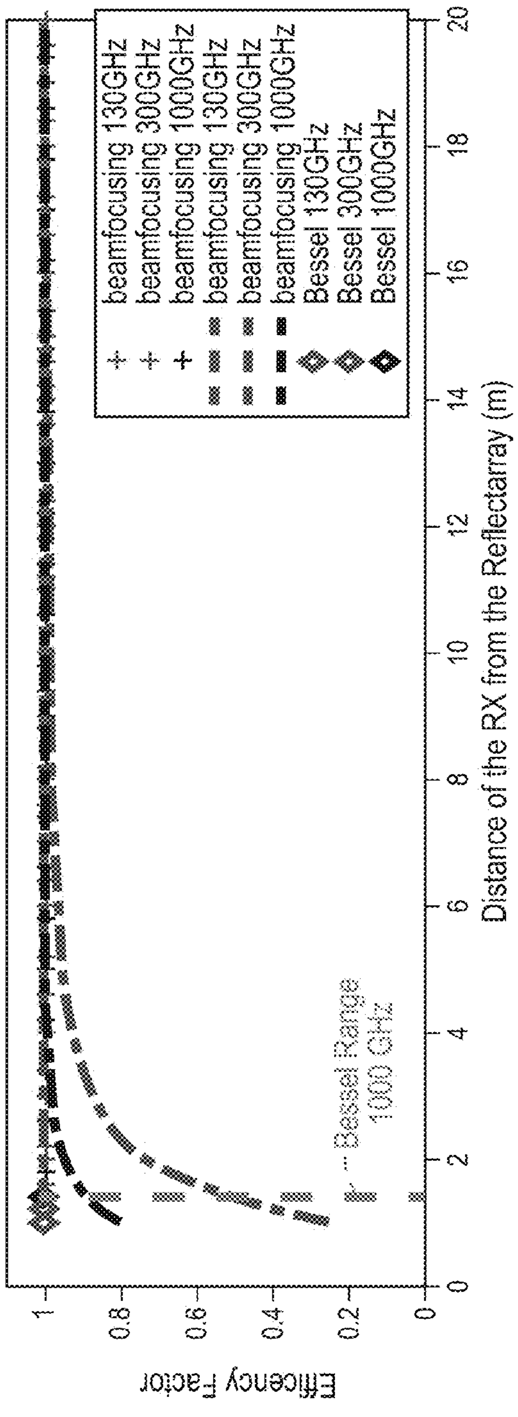
FIG. 12 shows the efficiency of an IRS ($EF_{IRS}$) with design parameters as per scenario 1 under the beamforming, beamfocusing, and Bessel Beam modes of operation of the reflectarray.
Figure 13:
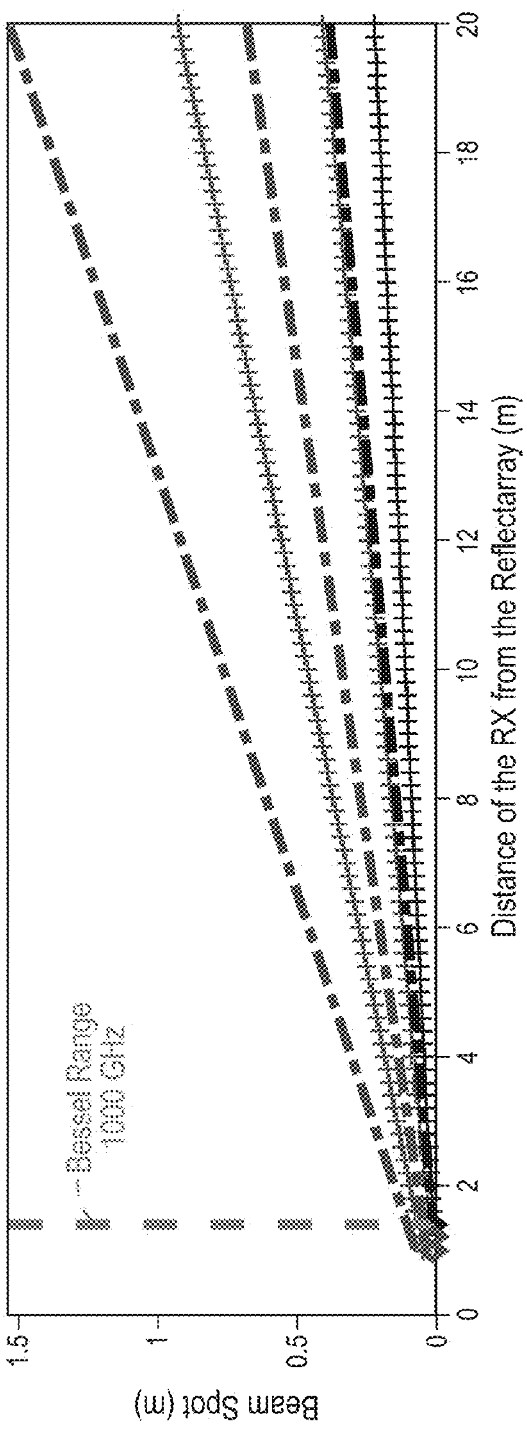
FIG. 13 shows the corresponding beam spots for Scenario 1 under the beamforming, beamfocusing, and Bessel Beam modes of operation of the reflectarray.

FIG. 13 shows the corresponding beam spots under the three modes of operation for the reflectarray (the key for FIG. 13 is the same as shown for FIG. 12). As expected, both beamforming and beamfocusing display similar trends, with increasing spot size as the distance increased. It is observed that a reduced gain requirement corresponds to greater spot size, regardless of the design frequency. Thus, the largest spot size is at 300 GHz, followed by 130 GHz, with the smallest spot size at 1 THz. As beamfocusing attempts to converge the wave front to a singularity, the resolution capability is better than that of beamforming. The beamwidth for Bessel beams remains the same within the confined propagation distance, regardless of the design frequency. The maximum propagation distance for the highest frequency of 1 THz is marked in the figure.

Figure 14:
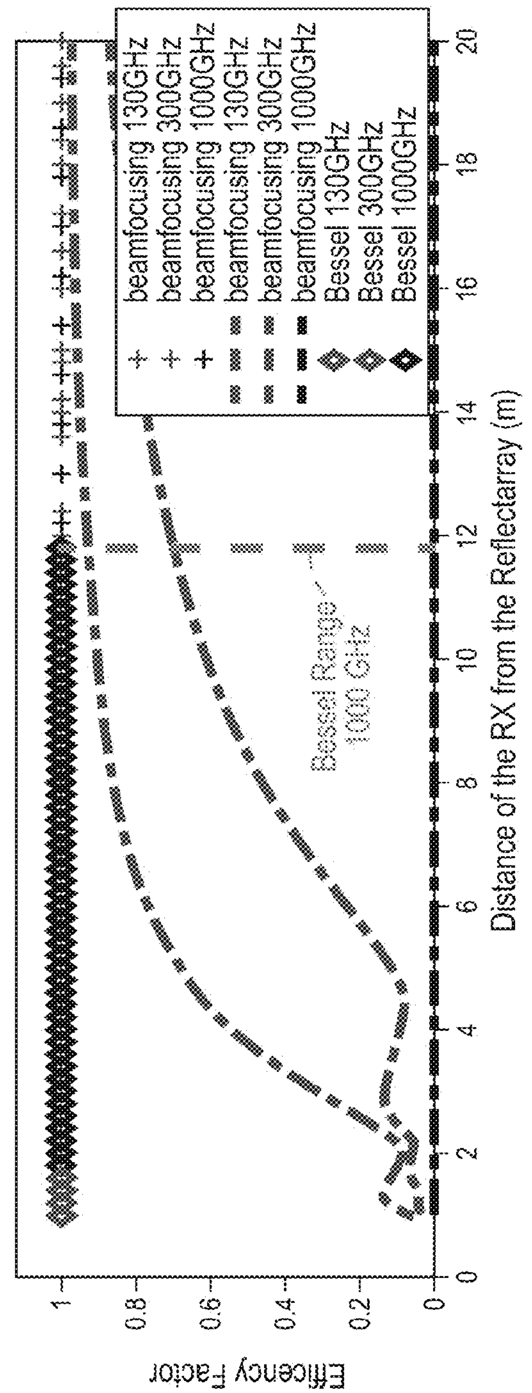
FIG. 14 shows the $EF_{IRS}$ the reflectarray for Scenario 2 under the beamforming, beamfocusing, and Bessel Beam modes of operation of the reflectarray.

Scenario 2: As evidenced by the corresponding parameters in Table III, the brunt of the required gain in this scenario is borne by the reflectarray. The requirement of very high gain at higher frequencies relates to a significantly increased reflectarray size, and a much larger far-field range. The $EF_{IRS}$ for the same modes of operation as in Scenario 1 are shown in FIG. 14. Beamfocusing efficiency is again unaffected. However, it is observed that beamforming operation is significantly degraded, and the decimating effects of the far-field effect cannot be ignored. Additionally, for very high frequencies, for example at 1 THz as shown in FIG. 14, the degradation results in an efficiency close to 0, and is strongly manifest even for the limits of most indoor communication scenarios, as the reflectarray→RX distance reaches tens of meters. In direct contrast however, the Bessel range over which maximum efficiency is guaranteed is significantly increased, and demands further investigation as a promising alternative. The longest range of Bessel propagation (at 1 THz) is again demarcated for a better perspective.

Figure 15:
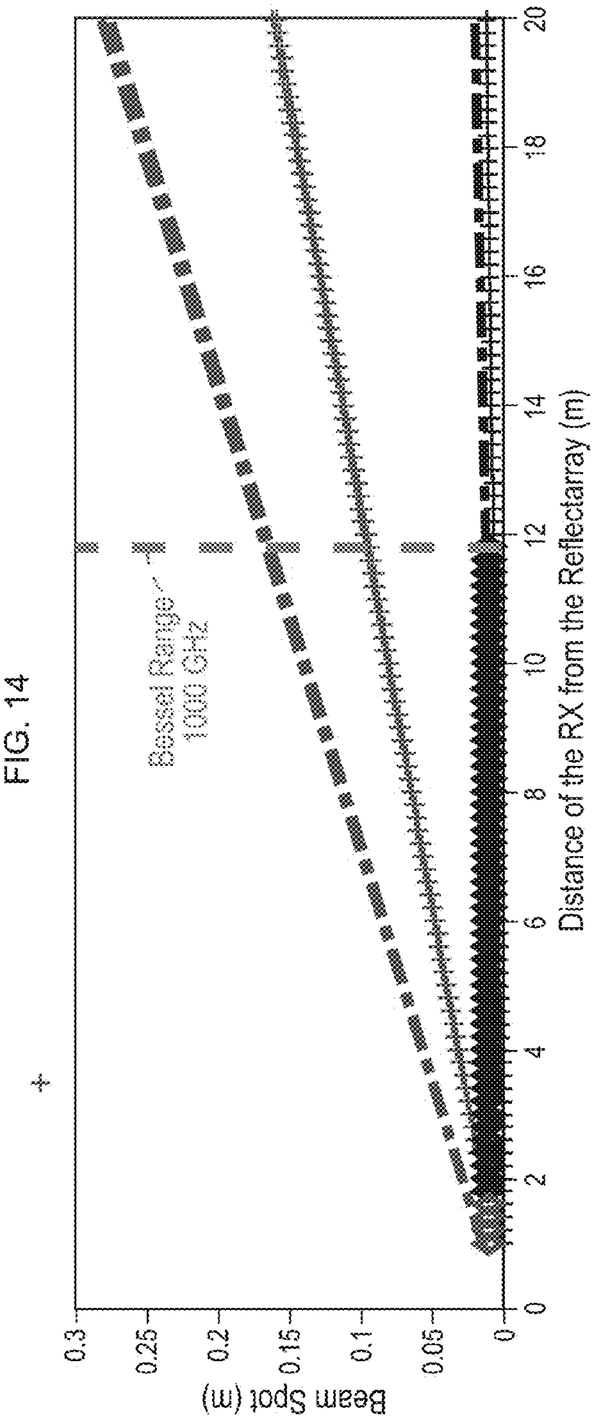
FIG. 15 shows the corresponding beam spots for Scenario 2 under the beamforming, beamfocusing, and Bessel Beam modes of operation of the reflectarray.

FIG. 15 shows the corresponding beam spots under the three modes of operation for the reflectarray designed with the parameters of Scenario 2 (as per Table III) (the key for FIG. 15 is the same as shown for FIG. 14). The very high gain requirement translates to a large electrical size aperture, which clearly suppresses the beamwidth and the corresponding spot size for both beamforming and beamfocusing, as compared to FIG. 13. While the trend lines follow a similar pattern as in the previous case, it is clearly seen that the Bessel range is significantly increased for all cases. Further, at 1 T Hz, the beam spot for all three modes is minuscule, as compared to the spot size for 130 GHz and 300 GHz. In such a setup, the flexible spot size design of the Bessel beam could be manipulated to optimize propagation distance, self-healing capability and beam-coverage criteria.

Scenario 3: With the reflectarray far-field distance fixed to 12 m, the generated reflectarray parameters at the design frequencies are again presented in Table III. The corresponding $EF_{IRS}$ for the modes of operation is presented in FIG. 16. Beamfocusing once again serves as the ultimate benchmark. As expected, it is observed that the beamforming $EF_{IRS}$ improves similarly for all frequencies of operation (the lines are stacked). As the confined far-field range places a restriction on the maximum reflectarray aperture, the Bessel range is reduced compared to that in Scenario 2. However, the largest design frequency again results in the greatest propagation distance.

Figure 16:
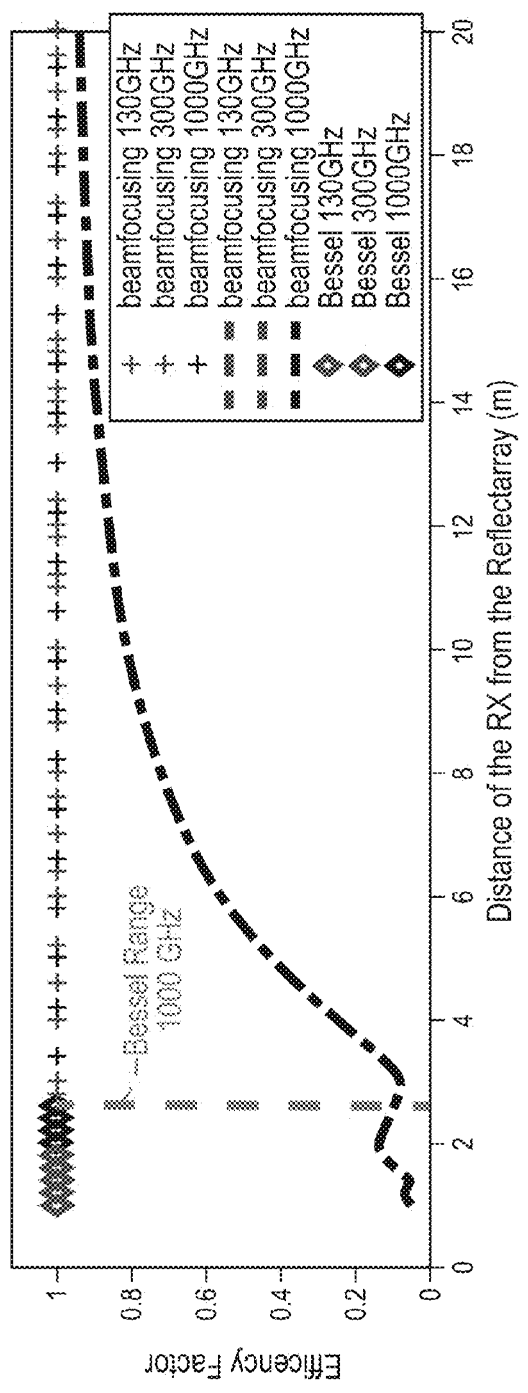
FIG. 16 shows the $EF_{IRS}$ the reflectarray for Scenario 3 under the beamforming, beamfocusing, and Bessel Beam modes of operation of the reflectarray.
Figure 17:
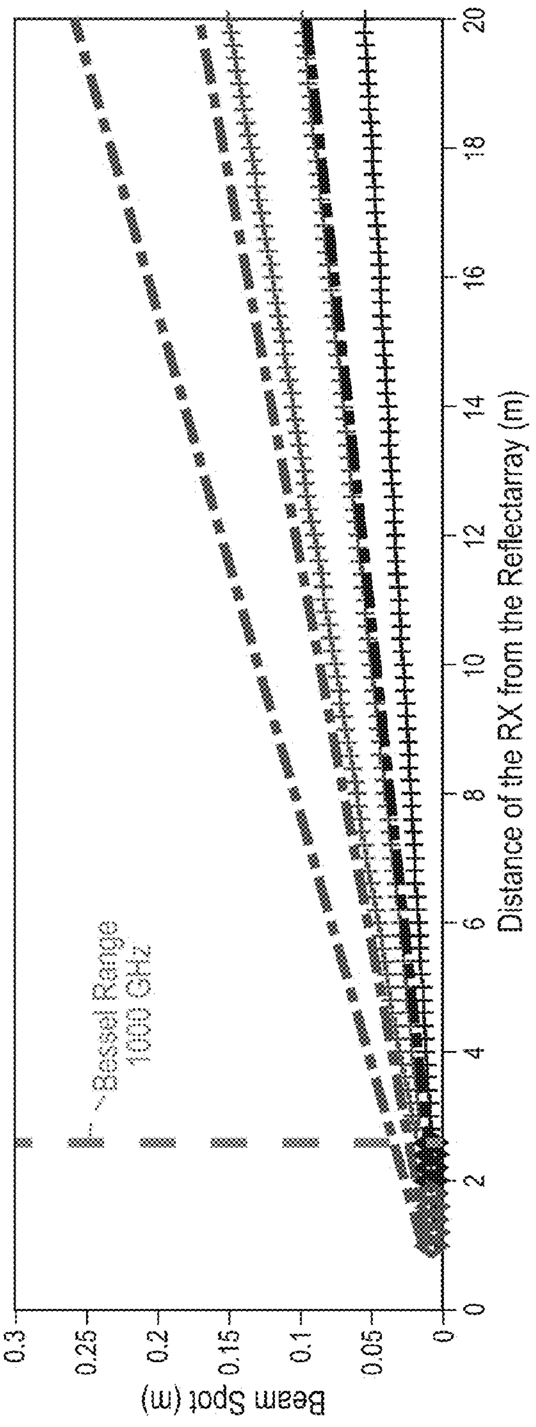
FIG. 17 shows the corresponding beam spots for Scenario 3 under the beamforming, beamfocusing, and Bessel Beam modes of operation of the reflectarray.

FIG. 17 shows the beam spots under the three modes of operation for the reflectarray designed with the parameters of Scenario 3 (again presented in Table III) (the key for FIG. 17 is the same as shown for FIG. 16). With the far-field fixed, we see that the effects on beam spots are only in terms of absolute measurements. The deviation of the electrical size of the reflectarray here, compared to the other two scenarios, relates to the corresponding deviation of the spot sizes. The relation between the spot sizes of beamforming, beamfocusing, and Bessel beams remain the same; the non-diffracting Bessel beam has maximum propagation at the highest design frequency and both beamforming and beamfocusing spot sizes are larger for the design frequency that is served with the lowest gain (the smallest electrical size). Interestingly, under this scenario with a fixed far-field, the smallest electrical size corresponds to the smallest frequency, 130 GHz.

The tuning speed of the plasmonic waveguide is governed by the charge time of the equivalent graphene-metal capacitor. Thus, the tuning time is on the order of picoseconds, and perfectly suited for real-time scenarios. To this end, other mechanical and temperature-based methods of phase control work at the millisecond range. During operation, the phase tuning should match possible environmental changes, and thus the speed of a few milliseconds is also sufficient to be considered real-time. However, the faster speed at which the plasmonic waveguide can be tuned is an advantage when calibration or beam-scanning has to be performed.

The reflectarray according to the described embodiments can be utilized as a cornerstone of intelligent reflecting surfaces (IRS), which utilize a passive array of elements for control of a communication environment. The reflectarray can be utilized to dynamically define NLoS links for increasing multipath and diversity gains for any communication link. The reflectarray can be utilized to act as an "off-the-chip" antenna array, for delivering high gain to compensate for the path loss in low-complexity and low-cost devices, where sophisticated beamforming architecture cannot be guaranteed at the end devices themselves. With continuous phase control, it is possible to operate the reflectarray within the near-field and define arbitrary wavefronts that may outperform conventional beamforming.

Even at frequencies other than the THz band, the design promises interesting merits. Other applicable materials that exhibit the graphene-based plasmonic waveguide characteristics could alternatively be used to achieve the same desired properties that the reflectarray described herein exhibits, at other design frequencies. The reflectarray response described herein can serve as a benchmark for comparing with such alternative solutions.

The reflectarray device described herein can be implemented as an intelligent reflecting surface (IRS). Next generation wireless standards and applications require very low latency, high data-rates and are expected to operate at (sub) THz-frequencies. The very high path losses and possibility of link outages due to blockage make the implementation of IRS an absolute necessity to guarantee acceptable performance. As evidenced by the massive thrust in both device design and channel studies, IRS devices are expected to be a key enabling technology for opening the door for high-frequency wireless communications.

Embodiments of the invention may be used to enhance security. In the same way that IRS s can be used to enhance signals in a particular direction, they can also be used to cancel signals in a given direction, thereby preventing eavesdropping or creating a denial-of-service situation to users.

While example embodiments have been particularly shown and described, it will be understood by those skilled in the art that various changes in form and details may be made therein without departing from the scope of the embodiments encompassed by the appended claims.

What is claimed is:

1. A hybrid radiating element, comprising:

a metallic patch antenna; and a graphene-based plasmonic modulator coupled to the metallic patch antenna, the metallic patch antenna and the graphene-based plasmonic modulator being substantially coplanar.

2. The hybrid radiating element of claim 1, wherein the graphene-based plasmonic modulator is a graphene stub, coplanar with the metallic patch antenna and electrically coupled to the metallic patch antenna.

3. A hybrid radiating element, comprising:

a dielectric substrate having a thickness, a top surface and a bottom surface;

an electrically conductive patch disposed on the top surface of the dielectric substrate;

a graphene stub disposed on the top surface of the dielectric substrate, the graphene stub being contiguous and coplanar with, and electrically coupled to, the electrically conductive patch; and an electrically conductive layer disposed on the bottom surface of the dielectric substrate.

4. The hybrid radiating element of claim 3, wherein a first inlet and a second inlet are formed in the electrically conductive patch along a first side of the electrically conductive patch, thereby forming a central stub of the electrically conductive patch between the first inlet and the second inlet, and wherein the graphene stub is electrically coupled to the electrically conductive patch at the central stub.

5. The hybrid radiating element of claim 3, further comprising an electrical conductor electrically coupled to the graphene stub, the electrical conductor configured to convey a control voltage to the graphene stub.

6. The hybrid radiating element of claim 5, wherein the electrical conductor (i) extends through the dielectric substrate and the electrically conductive layer and (ii) is electrically insulated from the electrically conductive layer.

7. The hybrid radiating element of claim 5, further comprising a voltage source electrically coupled to the electrical conductor, the voltage source configured to apply a bias voltage, with respect to the electrically conductive layer, through the electrical conductor to the graphene stub.

8. The hybrid radiating element of claim 7, wherein the bias voltage corresponds to a specific phase delay of a surface plasmon polariton wave propagating in the graphene stub.

9. The hybrid radiating element of claim 3, wherein the thickness of the substrate is greater than or equal to $0.0003\lambda_0$ and less than or equal to $0.05\lambda_0$, where $\lambda_0$ is a free space wavelength of EM radiation to be reflected by the hybrid radiating element.

10. The hybrid radiating element of claim 3, further comprising a hexagonal boron nitride layer disposed between the dielectric substrate and the graphene stub.

11. A hybrid reflectarray, comprising:

an array of hybrid radiating elements, each of which comprises:

a dielectric substrate having a thickness, a top surface and a bottom surface;

an electrically conductive patch disposed on the top surface of the dielectric substrate;

a graphene stub disposed on the top surface of the dielectric substrate, the graphene stub being contiguous and coplanar with, and electrically coupled to, the electrically conductive patch;

an electrical conductor electrically coupled to the graphene stub; and an electrically conductive layer disposed on the bottom surface of the dielectric substrate;

the array of hybrid radiating elements arranged in a grid pattern of M rows and N columns, an individual hybrid radiating element designated by (m, n) and being in an $m^{th}$ row and an $n^{th}$ column of the array.

12. The hybrid reflectarray of claim 11, wherein a center-to-center separation of immediately adjacent hybrid radiating elements is substantially equal to $\lambda_0/2$, where $\lambda_0$ is the desired operating wavelength of the hybrid reflectarray.

13. The hybrid reflectarray of claim 11, wherein the electrical conductor for each of the hybrid radiating elements extends through the dielectric substrate and the electrically conductive layer, and is electrically insulated from the electrically conductive layer.

14. The hybrid reflectarray of claim 13, wherein the electrical conductors from the hybrid radiating elements together form a codebook port of M×N electrical conductors.

15. The hybrid reflectarray of claim 14, further comprising a codebook generator coupled to the codebook port, wherein the codebook generator generates a bias voltage signal for each of the M×N hybrid radiating elements, thereby producing a codebook set of bias voltages $V_{m,n}$, for m from 1 to M and for n from 1 to N.

16. The hybrid reflectarray of claim 15, wherein the bias voltage signal for each of the M×N hybrid radiating elements represents a weight Wn, m, associated with the hybrid radiating element in the nth column and the mth row and the of the array of hybrid radiating elements.

17. The hybrid reflectarray of claim 15, wherein the codebook set of bias voltages Vm, n comprises a set of beamforming weights.

18. The hybrid reflectarray of claim 17, wherein the set of beamforming weights are of the form (beamforming weights)∈[1ei0, 1ei2π].

19. The hybrid reflectarray of claim 15, wherein the codebook set of bias voltages Vm, n comprises a phase transformation matrix.

20. The hybrid reflectarray of claim 19, wherein the phase transformation matrix is configured to generate a desired wavefront.

21. The hybrid reflectarray of claim 19, wherein the phase transformation matrix is configured to generate beamfocusing in the near-field.

22. The hybrid reflectarray of claim 19, wherein the phase transformation matrix is configured to generate Bessel-beams.

* * * * *